US009501556B2

(12) United States Patent
King et al.

(10) Patent No.: US 9,501,556 B2
(45) Date of Patent: Nov. 22, 2016

(54) IMPORTING METADATA INTO METADATA BUILDER

(71) Applicant: CA, Inc., Islandia, NY (US)

(72) Inventors: David Patrick King, Praha (CZ); James Michael Newman, Plano, TX (US)

(73) Assignee: CA, Inc., New York, NY (US)

( * ) Notice: Subject to any disclaimer, the term of this patent is extended or adjusted under 35 U.S.C. 154(b) by 291 days.

(21) Appl. No.: 14/223,260

(22) Filed: Mar. 24, 2014

(65) Prior Publication Data

US 2015/0269248 A1   Sep. 24, 2015

(51) Int. Cl.
*G06F 17/00*   (2006.01)
*G06F 17/30*   (2006.01)

(52) U.S. Cl.
CPC ... *G06F 17/30607* (2013.01); *G06F 17/30292* (2013.01); *G06F 17/30569* (2013.01)

(58) Field of Classification Search
CPC ............ G06F 17/30; G06F 8/71; G06F 8/70; G06F 17/2288; G06F 17/3012; G06F 17/30179; G06F 17/3023; G06F 17/30908
See application file for complete search history.

(56) References Cited

U.S. PATENT DOCUMENTS

| | | | |
|---|---|---|---|
| 6,714,979 | B1 | 3/2004 | Brandt et al. |
| 7,533,077 | B2 | 5/2009 | Wang |
| 8,793,223 | B1 | 7/2014 | Cho et al. |
| 2002/0049738 | A1 | 4/2002 | Epstein |
| 2003/0061209 | A1 | 3/2003 | Raboczi et al. |
| 2004/0064825 | A1* | 4/2004 | Lim ...................... G06F 9/4435 719/319 |
| 2005/0257210 | A1* | 11/2005 | Stienhans ........... G06F 9/44505 717/170 |
| 2006/0248123 | A1 | 11/2006 | Butash |
| 2007/0156726 | A1 | 7/2007 | Levy |
| 2008/0195651 | A1 | 8/2008 | Rachmiel et al. |
| 2008/0270992 | A1 | 10/2008 | Georgieva |
| 2009/0083295 | A1 | 3/2009 | Minamino et al. |
| 2009/0319365 | A1 | 12/2009 | Waggoner et al. |
| 2010/0180195 | A1 | 7/2010 | Behrens |
| 2011/0179110 | A1 | 7/2011 | Soloway |
| 2012/0089610 | A1 | 4/2012 | Agrawal et al. |
| 2013/0185657 | A1 | 7/2013 | Gunawardena et al. |
| 2013/0212116 | A1 | 8/2013 | Filliettaz, III |
| 2015/0149876 | A1 | 5/2015 | Davis et al. |

OTHER PUBLICATIONS

ArcGIS, "About validating metadata", downloaded Feb. 4, 2014 from http://help.arcgis.com/en/arcgisdesktop/10.0/help/index.html, 2 pp.

(Continued)

*Primary Examiner* — Robert Beausoliel, Jr.
*Assistant Examiner* — Hau H Hoang
(74) *Attorney, Agent, or Firm* — Myers Bigel, P.A.

(57) ABSTRACT

First metadata for a first version of a computer program product and a first metadata schema is converted into second metadata for a second version of the computer program product and/or a second metadata schema. The converting may be performed by recursively processing an object class structure representing the second metadata, to construct objects and their contents pursuant to a set of ID references for the second metadata. The recursive processing may be performed by repeatedly calling methods of an object in the object class structure to populate the content of the object using the set of ID references. The repeatedly calling may be performed using object reflection. Related methods, systems and computer programs are described.

19 Claims, 29 Drawing Sheets

(56) References Cited

OTHER PUBLICATIONS

ArcGIS, "Validate Metadata (Conversion)", downloaded Feb. 4, 2014 from http://help.arcgis.com/en%20/arcgisdesktop/10.0/help/index.html, 3 pp.

ArcGIS, "Validating metadata" downloaded Feb. 4, 2014 from http://help.arcgis.com/en/arcgisdesktop/10.0/help/index.html, 3 pp.

CA Technologies, "CA Chorus™ Software Manager", downloaded Oct. 29, 2013 from http://www.ca.com/us/products/detail/ca-mainframe-software-manager.aspx, 5 pp.

CA Technologies, Product Brief—"CA Chorus™ Software Manager Release 5.1", copyright 2013, 10 pp.

Wikipedia, the free encyclopedia, "Marshalling", downloaded Feb. 4, 2014 from http://en.wikipedia.org/w/index.php?title=Marshalling_(computer_science)&printable=yes, 2 pp.

Wikipedia, the free encyclopedia, "Metadata", downloaded Jan. 29, 2014 from http://en.wikipedia.org/w/index.php?title=Metadata&printable=yes, 12 pp.

Jaxb and Marshal/Unmarshal Schema Validation written by Blaise Doughan, Dec. 20, 2010, at http://blog.bdoughan.com/2010/12/jaxb-and-marshalunmarshal-schema.html.

* cited by examiner

My Projects

- Run Liquibase Script
- Update Standard Variables
- Change Log4j level
- Show Active Sessions
- Edit User Profile
- Edit Remote Credentials
- Import Configuration Starred Projects ⇔

☆ # DAVE

Starred Configurations ⇔

☆ AAAAAAA - 12 - 12
☆ CAJ0C10 - 1 - 1
☆ CAS9E10 - 1 - 1
☆ CAS9E10 - 11 - 11
☆ CAS9E10 - 88 - 88
☆ CBTDC00 - 1 - 1
☆ CBTDC00 - 1 - 1111
☆ CBTDC00 - 2 - 2
☆ CETJ300 - 1 - 1
☆ CETJ300 - 4 - 4
☆ NEWFMID - 1 - 1
☆ NEWFMID - 2 - 2

| All Projects | | |
|---|---|---|
| Filter | Clear | |
| Name ⇔ | | 1-25 of 49 ◁ ▷ △ |
| | | ✛ |
| ☆ # DAVE | | ✎ ✗ |
| ☆ # TEST | | ✎ ✗ |
| ☆ ANDJA17 MIM 11.8 CSM 6.0 Compliant SCS XML | | ✎ ✗ |
| ☆ ANDJA17 MIM 11.9 CSM 6.0 Compliant SCS XML | | ✎ ✗ |
| ☆ ANDJA17 MIM 12.0 CSM 6.0 Compliant SCS XML | | ✎ ✗ |
| ☆ CA 7 r12 | | ✎ ✗ |
| ☆ CA Chorus | | ✎ ✗ |
| ☆ CA Datacom/AD r14 (v1) | | ✎ ✗ |
| ☆ CA Datacom/DB r14 (v1) | | ✎ ✗ |
| ☆ CA Datacom/DB r15 (v1) | | ✎ ✗ |
| ☆ CA Datacom/DB version 15.0 (v1) | | ✎ ✗ |
| ☆ CA DB2 Tools R17 DEV | | ✎ ✗ |
| ☆ CA Easytrieve 11.6 | | ✎ ✗ |
| ☆ CA Hardware Interface Service | | ✎ ✗ |
| ☆ CA JARS 12.7 | | ✎ ✗ |
| ☆ CA Mainframe Connector for Linux on System z | | ✎ ✗ |
| ☆ CA OPS/MVS | | ✎ ✗ |
| ☆ CA PDSMAN | | ✎ ✗ |
| ☆ CA PMA Chargeback 12.7 | | ✎ ✗ |
| ☆ CA SMF Director 12.7 | | ✎ ✗ |
| ☆ CA SYSVIEW | | ✎ ✗ |
| ☆ CA Workload Automation ESP Edition 11.4 | | ✎ ✗ |
| ☆ CCS - CA MASTER - CEI0E10 | | ✎ ✗ |
| ☆ CCS - CAICCI - CAW4E10 | | ✎ ✗ |
| ☆ CCS - CAIENF - CAW1E10 | | ✎ ✗ |

FIG. 6

My Projects

- Run Liquibase Script
- Update Standard Variables
- Change Log4j level
- Show Active Sessions
- Edit User Profile
- Edit Remote Credentials
- Import Configuration Starred Projects ⇔
☆ # DAVE Starred Configurations ⇔
☆ AAAAAA - 12 - 12
☆ ABC0001 - 12 - 123
☆ CA10C10 - 1 - 1
☆ CASEI0 - 1 - 1
☆ CASEI0 - 11 - 11
☆ CASEI0 - 88 - 88
☆ CBTDC00 - 1 - 1
☆ CBTDC00 - 1 - 1111
☆ CBTDC00 - 2 - 2
☆ CET300 - 1 - 1
☆ CET300 - 4 - 4
☆ NEWFMID - 1 - 1
☆ NEWFMID - 2 - 2

XML Import

XML0001: 72i69 — cvc-complex-type.2.4.a: Invalid content was found starting with element 'mcd-cdStandardVariable'. One of '{"http://www.ca.com/mf20/mcd/ns/common":Description}' is expected. XML0001: 75:48 — cvc-complex-type.2.4.a: Invalid content was found starting with element 'mcd-cdPermittedValueList'. One of '{"http://www.ca.com/mf20/mcd/ns/common":ToolTip}' is expected. XML0001: 87:43 — cvc-complex-type.2.4.b: The content of element 'mcd-cdStandardVariable' is not complete. One of '{"http://www.ca.com/mf20/mcd/ns/common":ToolTip}' is expected. XML0001: 91:48 — cvc-complex-type.2.4.a: Invalid content was found starting with element 'mcd-cdPermittedValueList'. One of '{"http://www.ca.com/mf20/mcd/ns/common":ToolTip}' is expected. XML0001: 188:43 — cvc-complex-type.2.4.b: The content of element 'mcd-cdProductVariableGroup' is not complete. One of '{"http://www.ca.com/mf20/mcd/ns/common":LongDescription, "http://www.ca.com/mf20/mcd/ns/configurationDescriptor":IncludeCondition, "http://www.ca.com/mf20/mcd/ns/configurationDescriptor":ProductVariable, "http://www.ca.com/mf20/mcd/ns/configurationDescriptor":ProductVariableGroup}' is expected.

○ Project # [TEST          ▽]

○ Saved XML configuration file [Choose File] No file chosen
Please select a saved configuration xml file FMID, Version and GenLevel must be entered.
○ FMID [FAIL001]
○ Version [1]
○ Gen Level [123]

Name [This should not import]
Name, Relative Sequence # and Description are optional.
If not entered, the existing (imported) values will be used.

Relative Sequence # [1111111111]

Description [Import failure messages will be displayed]

Import Change Log ⊙ yes ○ no

[Import] [Cancel]

My Projects

- Run Liquibase Script
- Update Standard Variables
- Change Log4j level
- Show Active Sessions
- Edit User Profile
- Edit Remote Credentials
- Import Configuration Starred Projects ⇔

☆ # DAVE

Starred Configurations ⇔

☆ AAAAAAA - 12 - 12
☆ ABC0001 - 12 - 123
☆ CAJ0C10 - 1 - 1
☆ CAS9EI0 - 1 - 1
☆ CAS9EI0 - 11 - 11
☆ CAS9EI0 - 88 - 88
☆ CBTDC00 - 1 - 1
☆ CBTDC00 - 1 - 1111
☆ CBTDC00 - 2 - 2
☆ CETJ300 - 1 - 1
☆ CETJ300 - 4 - 4
☆ NEWFMID - 1 - 1
☆ NEWFMID - 2 - 2

All Projects

| Filter | Clear |

Name ⇔

☆ # DAVE
☆ # TEST
☆ ANDJA17 MIM 11.8 CSM 6.0 Compliant SCS XML
☆ ANDJA17 MIM 11.9 CSM 6.0 Compliant SCS XML
☆ ANDJA17 MIM 12.0 CSM 6.0 Compliant SCS XML
☆ CA 7 r12
☆ CA Chorus
☆ CA Datacom/AD r14 (v1)
☆ CA Datacom/DB r14 (v1)
☆ CA Datacom/DB r15 (v1)
☆ CA Datacom/DB version 15.0 (v1)
☆ CA DB2 Tools R17 DEV
☆ CA Easytrieve 11.6
☆ CA Hardware Interface Service
☆ CA JARS 12.7
☆ CA Mainframe Connector for Linux on System z
☆ CA OPS/MVS
☆ CA PDSMAN
☆ CA PMA Chargeback 12.7
☆ CA SMF Director 12.7
☆ CA SYSVIEW
☆ CA Workload Automation ESP Edition 11.4
☆ CCS - CA MASTER - CEI0EI0
☆ CCS - CAICCI - CAW4EI0
☆ CCS - CAIENF - CAW1EI0

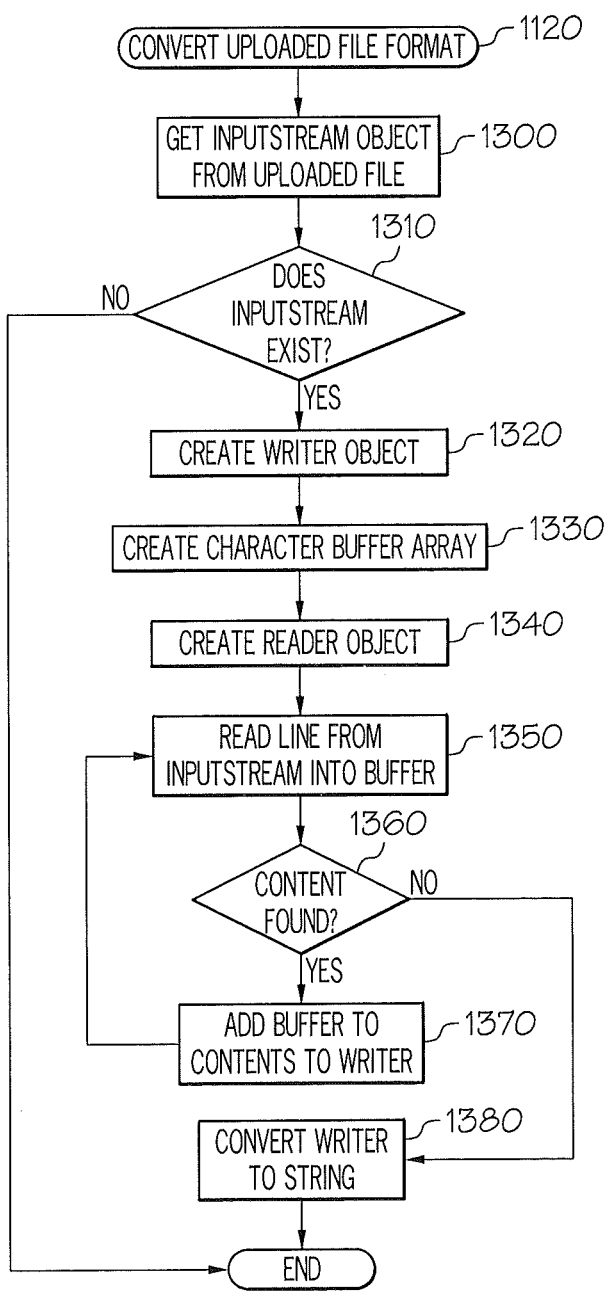

IMPORTING METADATA INTO METADATA BUILDER

BACKGROUND

Various embodiments described herein relate to computer systems, methods and programs, and more particularly to systems, methods and computer programs that provide metadata for a computer program.

Metadata is "data about data". In the context a computer program, metadata may be used to describe the content of the computer program using a given metadata standard.

Metadata itself is data that can be stored and managed in a database, often called a "metadata registry" or "metadata repository". Metadata is generally structured according to a standardized context using a well defined metadata schema. The metadata schema may contain the rules created to structure the fields or elements of metadata. The metadata schema may be expressed in a mark-up or programming language, such as Extensible Markup Language (XML). Metadata schema can be hierarchical in nature, where relationships exist between metadata elements, and elements are nested so that parent-child relationships exist between the elements. Thus, metadata may be expressed in a hierarchical object-oriented structure.

As the complexity of computer programs increase, the complexity of the metadata thereof may also increase. For example, an enterprise computer program, also referred to as a mainframe computer program, may contain hundreds of thousands of lines of associated metadata. A specific example will now be provided relative to mainframe computer programs marketed by CA, Inc. ("CA"), the assignee of the present application.

Specifically, CA mainframe computer programs generally require metadata that CA Mainframe Software Manager (CA MSM), now known as CA Chorus™ Software Manager (CA CSM), uses to configure the program after installation and deployment. The metadata is written in XML using an XML editor. The metadata must be error-free, complete, and must conform to a metadata schema that is specified by CA CSM Software Configuration Service (SCS).

Unfortunately, a mainframe computer program may include on the order of 150,000 lines of XML metadata. It is, therefore, difficult and time consuming to design metadata that is error-free and complete using an XML editor.

BRIEF SUMMARY

Various embodiments described herein can convert first metadata for a first version of a computer program and a first metadata schema into second metadata for a second version of the computer program and/or a second metadata schema. The first version of the computer program may be older than the second version of the computer program and the first metadata schema may be older than the second metadata schema.

In some embodiments, the converting comprises recursively processing an object class structure representing the second metadata, to construct objects and their contents pursuant to a set of ID references for the second metadata. In other embodiments, the recursively processing may comprise repeatedly calling methods of an object in the object class structure to populate the content of the object using the set of ID references. The repeatedly calling may be performed using object reflection.

In more detail, in some embodiments, the converting may comprise importing a first XML file comprising the first metadata into a first XML object and obtaining working variables for the second metadata and/or the second version of the computer program. A first set of ID references in the first XML object is converted to a second set of ID references. The first XML object that includes the second set of ID references is unmarshalled, to generate a first object class structure that conforms to the second metadata schema and/or the second version of the computer program, using the working variables. The first object class structure is recursively processed to construct objects and their contents pursuant to a second set of ID references, to thereby generate a second object class structure. The second object class structure is marshalled to create a second XML object.

In some embodiments, the recursively processing comprises traversing the first object class structure to identify an object therein that contains a member of the second set of ID references. Methods of the object that was identified by the traversing are then called to populate the content of the object that was identified by the traversing, using the member of the second set of ID references. The traversing and the calling are then repeatedly performed until the objects in the first object class structure have been processed. In some embodiments, the calling comprises using object reflection to call the methods of the object that was identified by the traversing, using the member of the second set of ID references.

It will also be understood that various embodiments have been described above in connection with methods of operating a computer system. However, various other embodiments described herein can provide analogous computer systems and computer programs.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

The accompanying drawings, which are included to provide a further understanding of the present disclosure and are incorporated in and constitute a part of this application, illustrate certain embodiment(s). In the drawings:

FIGS. 6-10 are screen shots of a user interface that may be used to interact with a metadata builder according to various embodiments described herein.

FIGS. 11-21, 22A-22B, 23A-23B and 24-30 are flowcharts of operations that may be performed by a metadata builder according to various other embodiments described herein.

DETAILED DESCRIPTION

Various embodiments described herein can provide a MetaData Builder (MDB) that allows metadata to be built by the way of two-way user interaction, that can generate metadata that is complete and error-free. As was noted above, a mainframe computer program may include on the order of 150,000 lines of XML metadata. It may be difficult to provide complete and error-free XML data of this magnitude using an XML editor.

Various embodiments will be described herein in connection with specific CA mainframe computer programs. However, various embodiments described herein may be used with mainframe computer programs that are distributed by other organizations and/or for other computer programs, such as enterprise, application, personal, pervasive and/or embedded computer programs.

Figure 1:
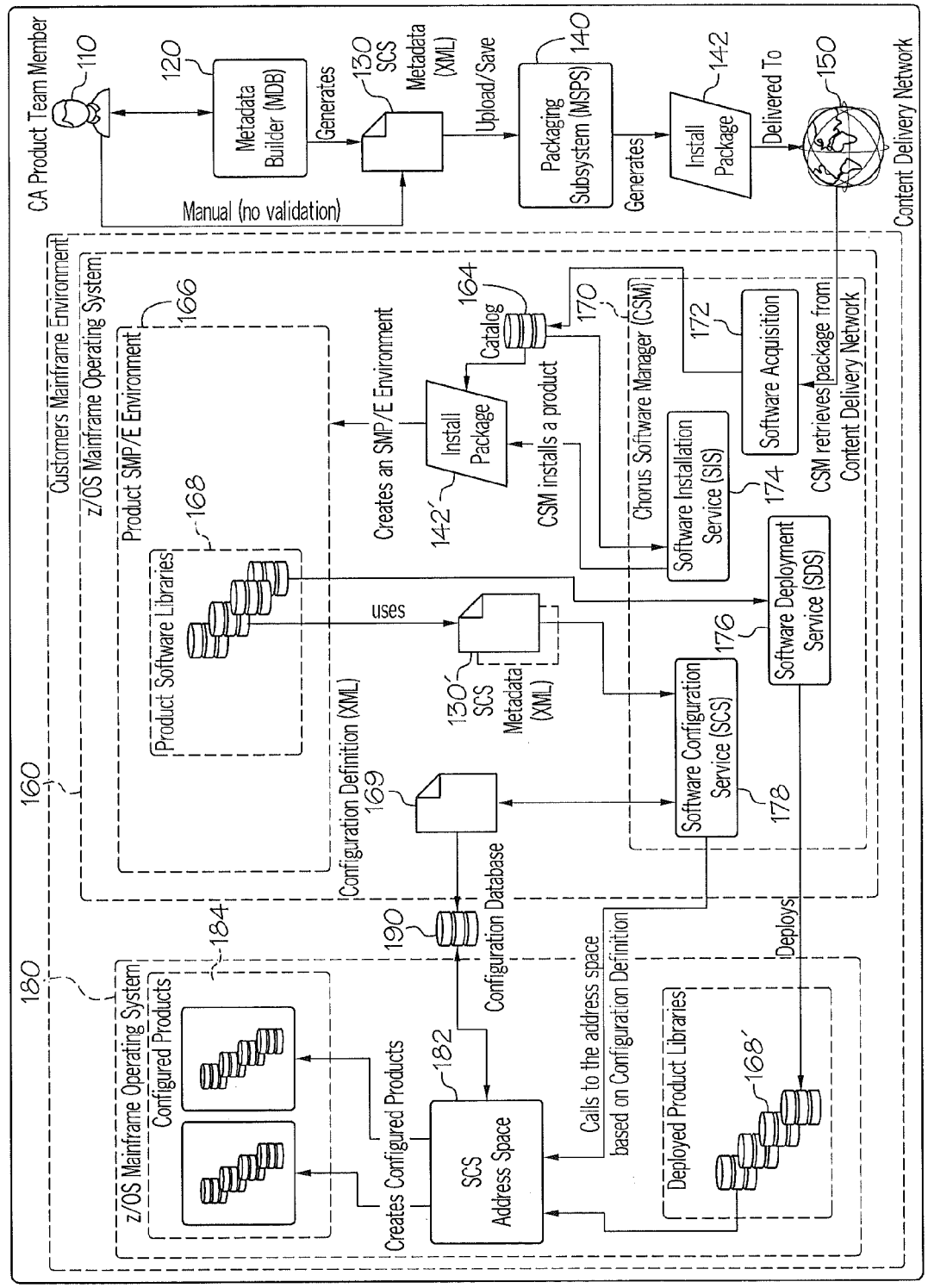
FIG. 1 is a block diagram of a computer program development and use environment according to various embodiments described herein.

FIG. 1 is a block diagram of a computer program (also referred to herein as "a computer program product" or simply as a "product") development and use environment according to various embodiments described herein.

Referring to FIG. 1, a metadata developer, such as a CA Product Team Member 110 at a user terminal, interacts with a MetaData Builder (MDB) 120 according to various embodiments described herein, to produce XML Software Configuration Services (SCS) metadata 130. The SCS metadata 130 is then packaged with a CA product by a packaging subsystem 140, and the resulting install package 142 is distributed to the customer using a content delivery network, such as the CA Content Delivery Network 150.

In the customer's mainframe environment 160, Chorus Software Manager (CSM) 170 uses its Software Acquisition component 172 to retrieve the install package 142 from the Content Delivery Network 150. The install package 142' is then stored as information in a Catalog database 164. The CSM 170 Software Installation Service (SIS) 174 uses a product's associated Install Package 142' located in the Catalog database 164 to create an SMP/E Environment 166. Each SMP/E Environment 166 contains a set of software libraries 168 associated with the installed product. The CSM 170 Software Deployment Service (SDS) 176 transmits a copy of the Product Software Libraries 168' to the mainframe system where the deployed product is to be configured 180.

The SCS metadata 130' which was created by the MDB 120 and is included within one or more of the installed Product Software Libraries 168 is used by the Chorus Software Manager (CSM) 170 Software Configuration Services (SCS) 178 to create a Configuration Definition 169. A Configuration database 190 is updated with the resulting Configuration Definition 169.

The CSM 170 SCS 178 interacts with the SCS Address Space 182 running on a z/OS Mainframe 180 where the deployed Product Libraries 168' are accessed to create a configured instance of the product 184. SCS 178 interacts with the SCS Address Space 182 to orchestrate the implementation of a set of configuration operations defined in the constructed Configuration Definition 169. Each SCS Configured Product 184 is constructed using its associated SCS Metadata 130 that was created and generated by the MDB 120.

It will be understood that any of the blocks of FIG. 1 including the MDB 120, packaging subsystem 140, content delivery network 150 and the customer's mainframe environment 160, and/or any combination or subcombination of the blocks of FIG. 1, may be embodied as one or more enterprise, application, personal, pervasive and/or embedded computer systems that are operable to receive, transmit, process and store data using any suitable combination of software, firmware and/or hardware and that may be standalone or interconnected by any conventional, public and/or private, real and/or virtual, wired and/or wireless network including all or a portion of the global communication network known as the Internet, and may include various types of tangible, non-transitory computer readable media.

Figure 2:
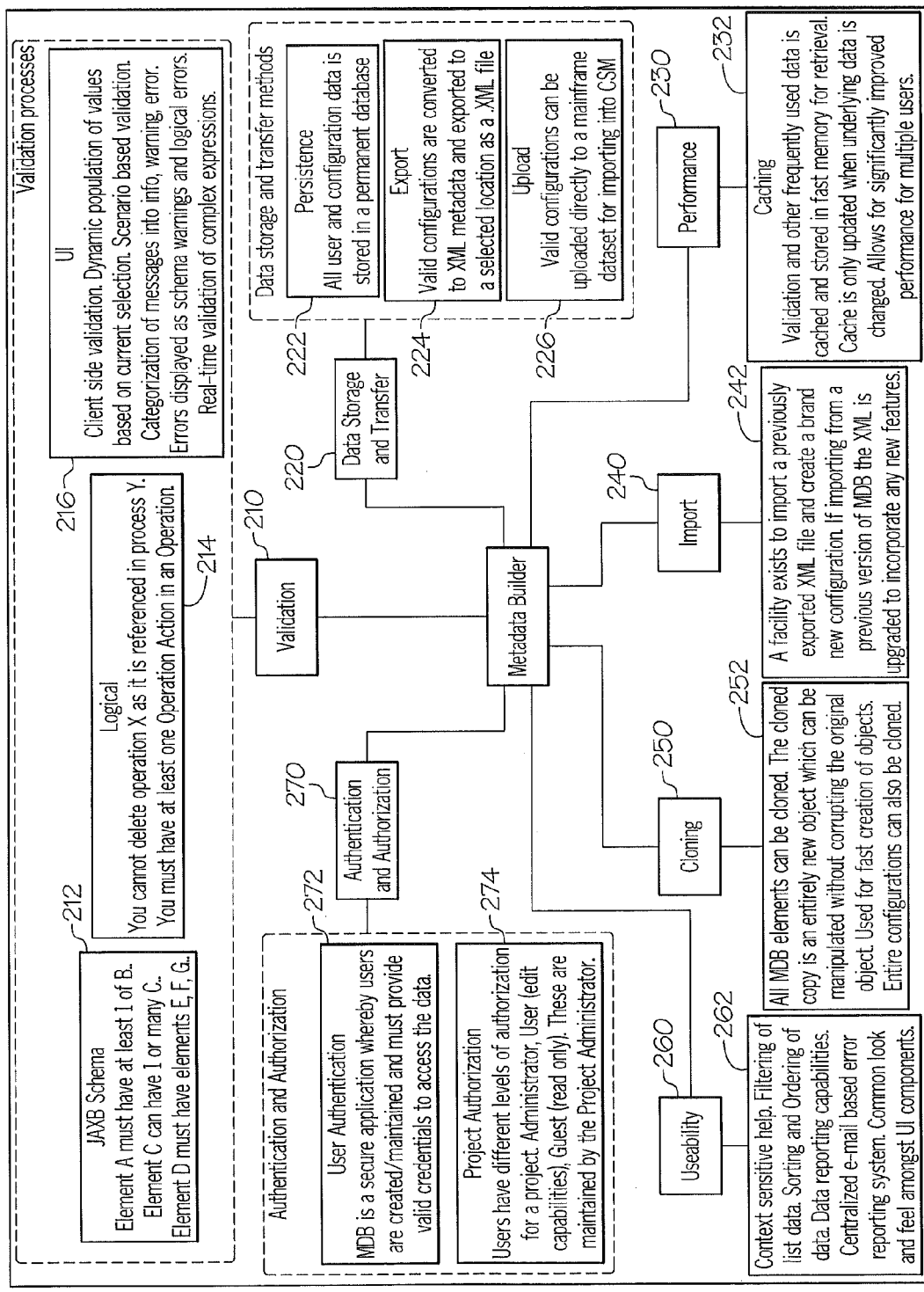
FIG. 2 is a block diagram of a metadata builder according to various embodiments described herein.

FIG. 2 is a block diagram of a metadata builder according to various embodiments described herein, which may correspond to the MDB 120 of FIG. 1. The MDB 120 includes a validation system 210, a data storage and transfer system 220, a performance system 230, an importing system 240, a cloning system 250, a usability system 260 and an authentication and authorization system 270.

The authentication and authorization system 270 provides user authentication (Block 272) and also allows different levels of authorization for the project (Block 274), so that, for example, one user may have write access, while other users may have read access. The validation system 210 provides schema validation 212, logical validation 214 and a User Interface (UI) 216 that provides interactive metadata creation. The data storage and transfer system 220 allows persistent storage of configuration data as it is created (Block 222), allows exporting of valid configurations (Block 224) and uploading of the valid configuration to CSM (Block 226). The performance system 230 provides caching (Block 232) of validated and frequently used data to allow improved performance with multiple users. The importing system 240 provides a facility to import a previously exported XML metadata set and create a new configuration (Block 242). The cloning system 250 allows new data objects to be cloned from existing data objects (Block 252). Finally, the usability function 260 provides context-sensitive help and other usability functions (Block 262).

Various embodiments of logical validation 214 are described in application Ser. No. 14/223,376, entitled "Logical Validation for Metadata Builder", filed concurrently herewith, the disclosure of which is hereby incorporated herein by reference in its entirety as if set forth fully herein. Various embodiments of schema validation 212 are described in application Ser. No. 14/223,440, entitled "Schema Validation for Metadata Builder", filed concurrently herewith, the disclosure of which is hereby incorporated herein by reference in its entirety as if set forth fully herein. Various embodiments of importing 240 are described in the present application. Finally, various embodiments of a user interface 216 are described in application Ser. No. 14/223,307, entitled "Interactive User Interface for Metadata Builder", filed concurrently herewith, the disclosure of which is hereby incorporated herein by reference in its entirety as if set forth fully herein.

Importing

High Level Description

The present embodiments provide an import function, such as the import function 240 of FIG. 2, for a metadata builder, such as MDB 120 of FIG. 2. The import function allows metadata that was previously designed using an XML editor to be validated by the metadata builder, to thereby create a more accurate set of metadata for the existing product. The import function 240 also allows an existing set of metadata, that may or may not have been generated using metadata builder, to be updated to conform to a new version of a computer program product. Thus, metadata for an earlier version of a computer program product may be validated relative to a new version of a computer program product, rather than generating a completely new set of metadata for the new computer program product.

Importing XML into the metadata builder can reduce the repetitive manual process of creating new metadata. An existing manually-created XML file or, indeed, an existing metadata builder-exported XML file, can be imported into the application and a new configuration created. The imported XML is subject to full validation before creation, and errors may be reported to the user. The import process is also used to "upgrade" metadata from a previous version of the metadata builder schema to a new version of the schema or from a previous version of a product to a new version of the product.

Accordingly, various embodiments described herein can provide a method of operating a computer system that comprises converting first metadata for a first version of a computer program product and a first metadata schema into second metadata for a second version of the computer program product and/or for a second metadata schema. In some embodiments, the first version of the computer program product is older than the second version of the computer program product and the first metadata schema is older than the second metadata schema.

Figure 3:
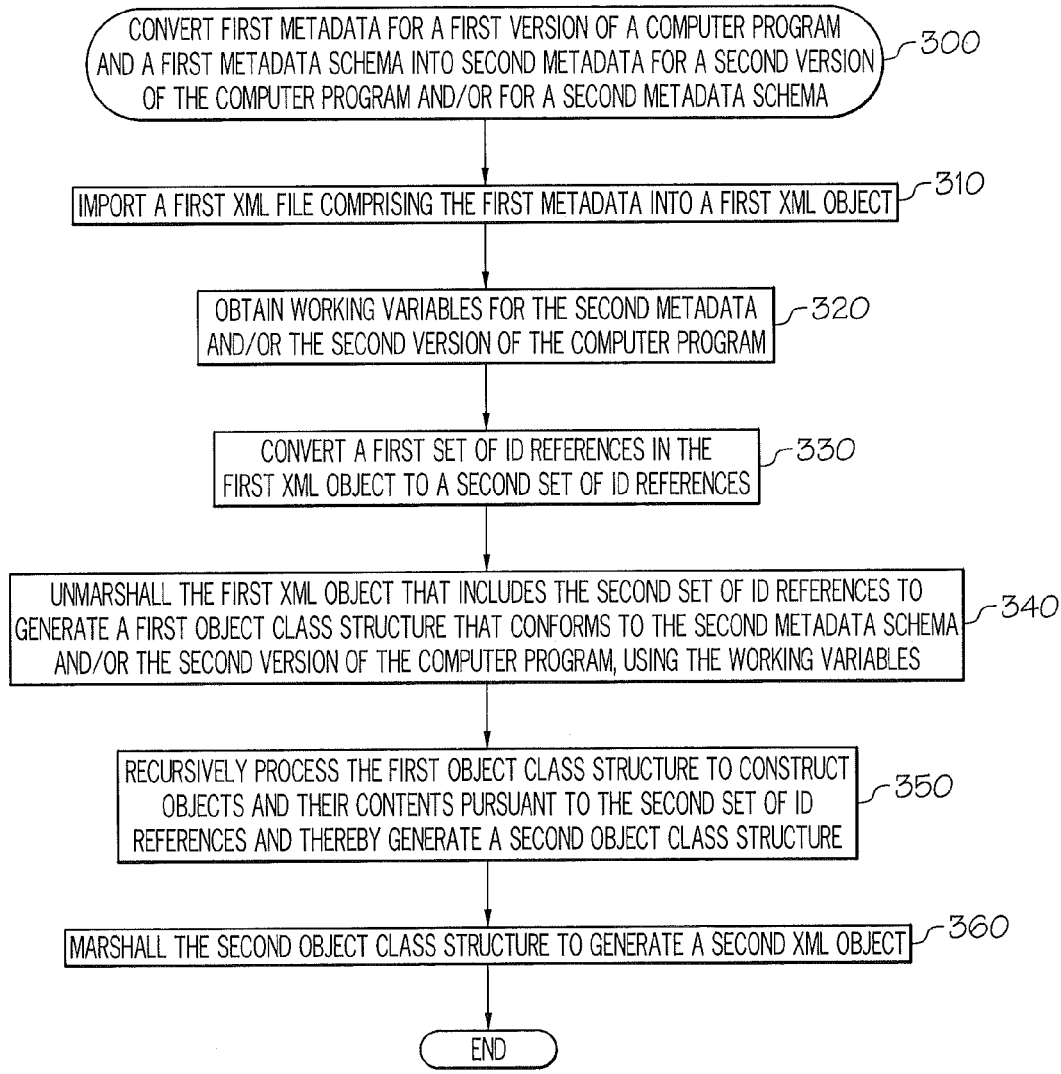
FIGS. 3-4 are flowcharts of operations that may be performed to convert first metadata for a first version of a computer program and a first metadata schema into second metadata for a second version of the computer program and/or for a second metadata schema according to various embodiments described herein.

FIG. 3 is a flowchart of operations that may be performed to convert first metadata for a first version of the computer program product and a first metadata schema into second metadata for a second version of the computer program product and/or for a second metadata schema (Block 300). These operations may be performed by a metadata import function 240 of a metadata builder 120 of FIG. 2.

Referring to FIG. 3, an XML file comprising a first metadata is imported into a first XML object at Block 310. At Block 320, working variables for the second metadata and/or the second version of the computer program product are obtained. At Block 330, a first set of ID references in the first XML object are converted to a second set of ID references. As used herein, the term "ID reference" means a string identifier which allows the value of one XML element to be an element elsewhere in the metadata provided that the value of the ID reference is the ID value of the referenced element. The ID represents a unique ID name for the attribute that identifies the element within the context of the metadata. An ID reference may also be referred to herein as a "reference ID" or simply as an "ID". At Block 340, the first XML object that includes the second set of ID references is unmarshalled, to generate a first object class structure that conforms to the second metadata schema and/or the second version of the computer program product, using the working variables. As used herein, the term "unmarshalling" means an operation such as may be provided by a Java™ programming language, to covert an XML string into a Java object structure. At Block 350, the first object class structure is recursively processed to construct objects and their contents pursuant to the second set of ID references, and thereby generate a second object class structure. Finally, at Block 360, the second object class structure is marshalled to generate a second XML object. As used herein, "marshalling" means an operation, such as provided by a Java programming language, to convert a Java object into an XML object.

Figure 4:
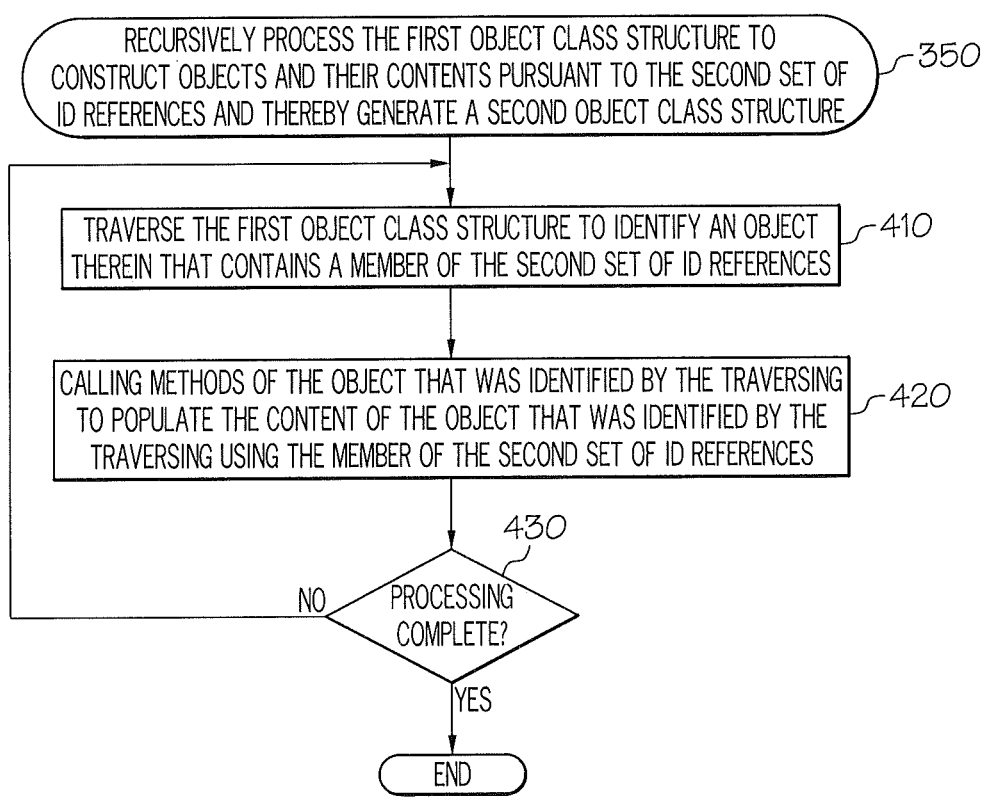

FIG. 4 is a flowchart of operations that may be performed to recursively process the first object class structure to construct objects and their contents pursuant to the second set of ID references, and thereby generate a second object class structure, which may correspond to Block 350 of FIG. 3. Referring to FIG. 4, at Block 410, the first object class structure is traversed to identify an object therein that contains a member of the second set of ID references. At Block 420, methods of the object that was identified are called to populate the content of the object that was identified using the member of the second set of ID references. Calling may be performed by using object reflection to call the methods of the object that was identified using the member of the second set of ID references. As used herein object "reflection" is a computer operation that allows inspection of classes, interfaces, fields and methods at runtime, without knowing the names of the interfaces, fields and/or methods at compile time. It also allows instantiation of new objects and invocation of methods. Reflection can also be used to adapt a given program to given situations dynamically. At Block 430, a determination is made as to whether the objects in the first class structure have all been processed. If so, operations end. If not, the operations of Blocks 410 and 420 are repeated until the objects in the first object class structure have been processed.

To briefly summarize various embodiments described herein, the information pertaining to a CA product which can be deployed on a mainframe by CA Chorus™ Software Manager (CSM) is contained in metadata in XML format. This metadata is constructed by means of a user interface application called CA Chorus™ Software Manager SCS MetaData Builder (MDB). The metadata can also be constructed externally to MDB. In the MDB application, the metadata is stored in data objects known as "configurations". The creation of a configuration is an iterative process through which the user is guided by various validation and messaging techniques. When a configuration is complete (contains no errors) it can be exported to an external file for storage on a file system or uploaded directly to a mainframe for storage within a data set.

A function also exists whereby an existing metadata file can be imported into MDB and a new configuration created using the information contained within the original metadata. This new configuration can then be modified to the user's requirements. The MDB Import Metadata feature according to various embodiments described herein enables a user to accomplish this task.

Some information must be entered by the user via a UI in the MDB application. Once this basic information is validated the imported file is then subject to series of validation and transformative tasks explained in more detail below. MDB configurations are tied to a series of schema documents which have an assigned schema version number. A particular schema version may have rules which are not compatible with newer schema versions. The import metadata function allows for metadata which belongs to a schema version older than the "current" schema version to be modified as part of the import process and upgraded to the current version. Any errors which are encountered during the import process are presented to the user in the MDB user interface as an error message(s). These messages may contain diagnostic information and/or locations of where the error occurred. If an import is successful then the configuration is contained within a pre-selected project and persisted to the MDB database. The configuration is also "starred" meaning that it is listed in a "quick-access" panel, allowing the user to edit the project without the need to go through the main project and configuration lists.

Importing

Intermediate Level Description

Figure 5:
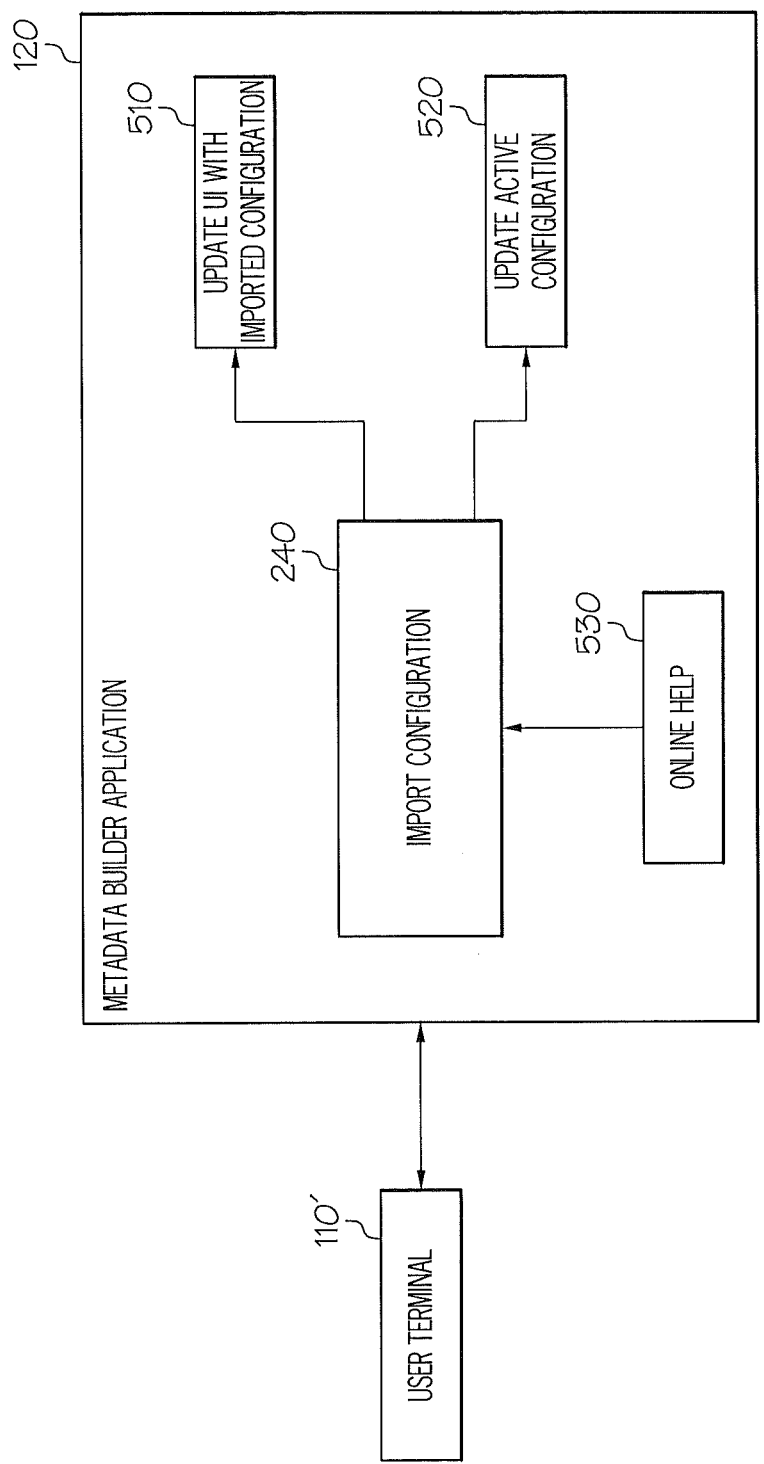
FIG. 5 is a block diagram of a metadata builder according to various other embodiments described herein.

FIG. 5 is a block diagram of a metadata builder, such as the metadata builder 120 of FIG. 1 or 2, according to various embodiments described herein. A user at a user terminal 110' interacts with the metadata builder application 120 The user terminal 110' may include tablets and/or smart phones, laptop and/or desktop computers and/or any other user terminal with which a user 110 interacts with the metadata builder 120.

Figure 7:
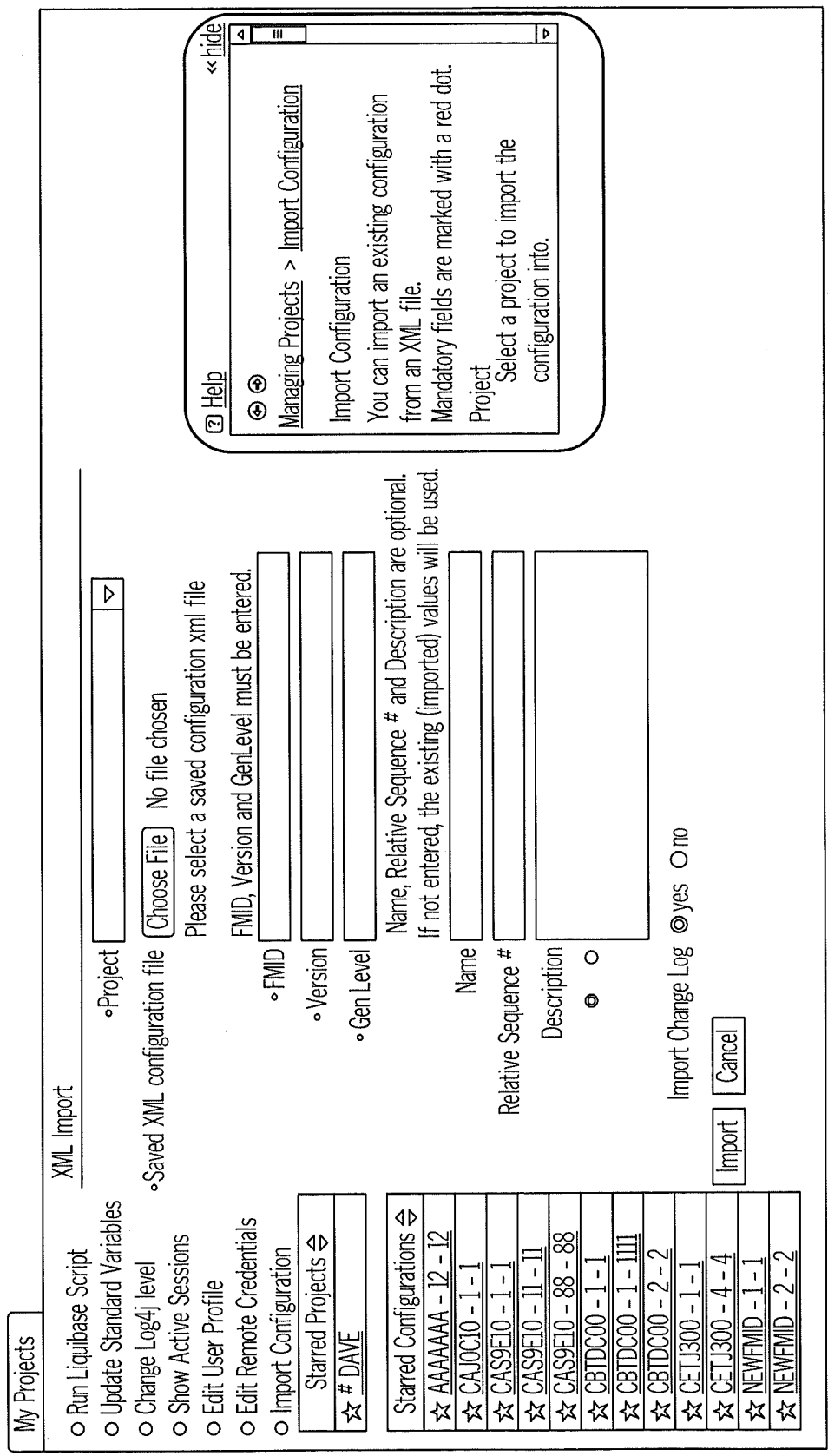

FIG. 6 illustrates a user interface that may be used to interact with the metadata builder application. Selecting the "Import Configuration" hyperlink from the initial panel displayed when logged onto the metadata builder will present the user with a form into which import details can be entered. The form is illustrated in FIG. 7. This form contains components also referred to as "working variables", some of which are mandatory and others of which are optional. Based on the information entered in the form of FIG. 7, a selected file is processed by the Import Configuration function and, if successful, a new configuration is added to the requested project and opened in the metadata builder.

More specifically, referring to FIG. 7, the following details can be entered by the user at the user terminal 110':

Project—All configurations are contained within a project. A project may contain many configurations. Only projects for which the user is authorized to will be displayed in the drop down list. The dot to the left of the component signifies that this is a required field.

Saved XML configuration file—Pressing this button will bring up a file selection dialog which allows the user to select a pre-saved file which contains configuration metadata in XML format. The XML may or may not have been generated and previously exported by MDB. The selected file will go through the validation process and will have the user details applied.

FMID—Function Module ID. A component which identifies the configuration when deployed to a mainframe. (Required.)

Version—A further way of identifying this configuration. (Required.)

Gen Level—A further way of identifying this configuration. (Required.)

Name—A descriptive name used to summarize or briefly describe the configuration. This field is optional, meaning that if supplied it will override the name in the original (Saved XML) file.

Relative Sequence #—A unique identifier used to signify a base configuration or increments of the same configuration (FMID+Version+Gen Level). (Optional/ Override.)

Description—A way of verbosely describing the configuration.

Import Change Logs—Change logs are methods of allowing users of a configuration to log time-stamped information relating to the configuration. By default they are imported into the new configuration but by selecting "no", they can be ignored.

The circled area on the right of FIG. 7 shows where on-screen information/help relating to this form may be displayed. Clicking the "Import" button begins the process. If the import was unsuccessful, the user is presented with a list of errors, as shown in FIG. 8. Specifically, if a configuration fails to import, the reasons for the failure are presented to the user in the form of UI error messages. In the example below the candidate configuration failed due to a number of schema violations. The line and column numbers are contained in the message to allow the user to determine why the failure occurred.

Figure 9:
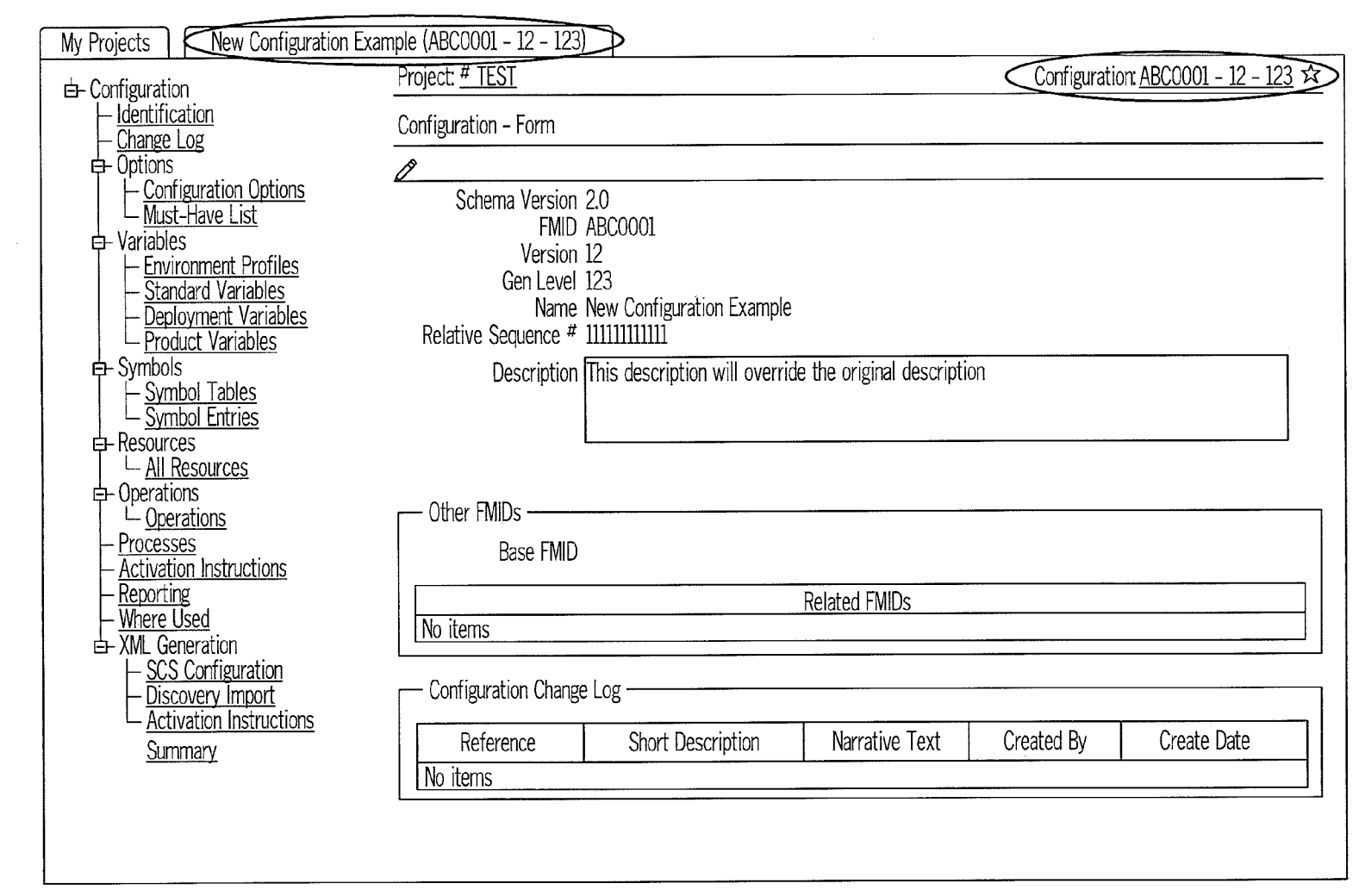

Referring again to FIG. 5, at Block 510, after a successful import, the new configuration is automatically opened as a tab in the browser window, and the user may begin editing the configuration immediately, as shown in FIG. 9. Specifically, a configuration which was successfully imported is automatically opened in the application as a tab (circled in FIG. 9), the main information page for the configuration is presented and an edit lock is obtained for the user for this configuration. The hyperlink on the left of FIG. 9 shows that this configuration is "starred". Starred configurations may be displayed in a separate panel to allow for faster access, as illustrated in FIG. 10. If a user is the creator of a configuration, it is automatically starred for them. It can be starred/ un-starred by users as desired.

Thus, the successfully imported configuration from FIG. 9 is now displayed on the main project list page as a starred item, as illustrated in FIG. 5. Clicking on this hyperlink allows the user to enter the configuration without having to first go to the parent project list.

At Block 520 of FIG. 5, as part of the UI presenting the new configuration to the user for editing, an edit lock is acquired for the configuration, so that no other user may concurrently edit the configuration. Specifically, if no edit lock is present when the link is selected, then the current user will be assigned edit rights and the configuration locked. If it is locked by another user, the configuration can only be browsed in read-only mode. Configurations may be un-starred by clicking the star to the left of the configuration identification link.

Finally, referring to Block 530 of FIG. 5, context-sensitive help is available on the import form (FIG. 7). This can aid the user in filling out the details of the form.

Figure 11:
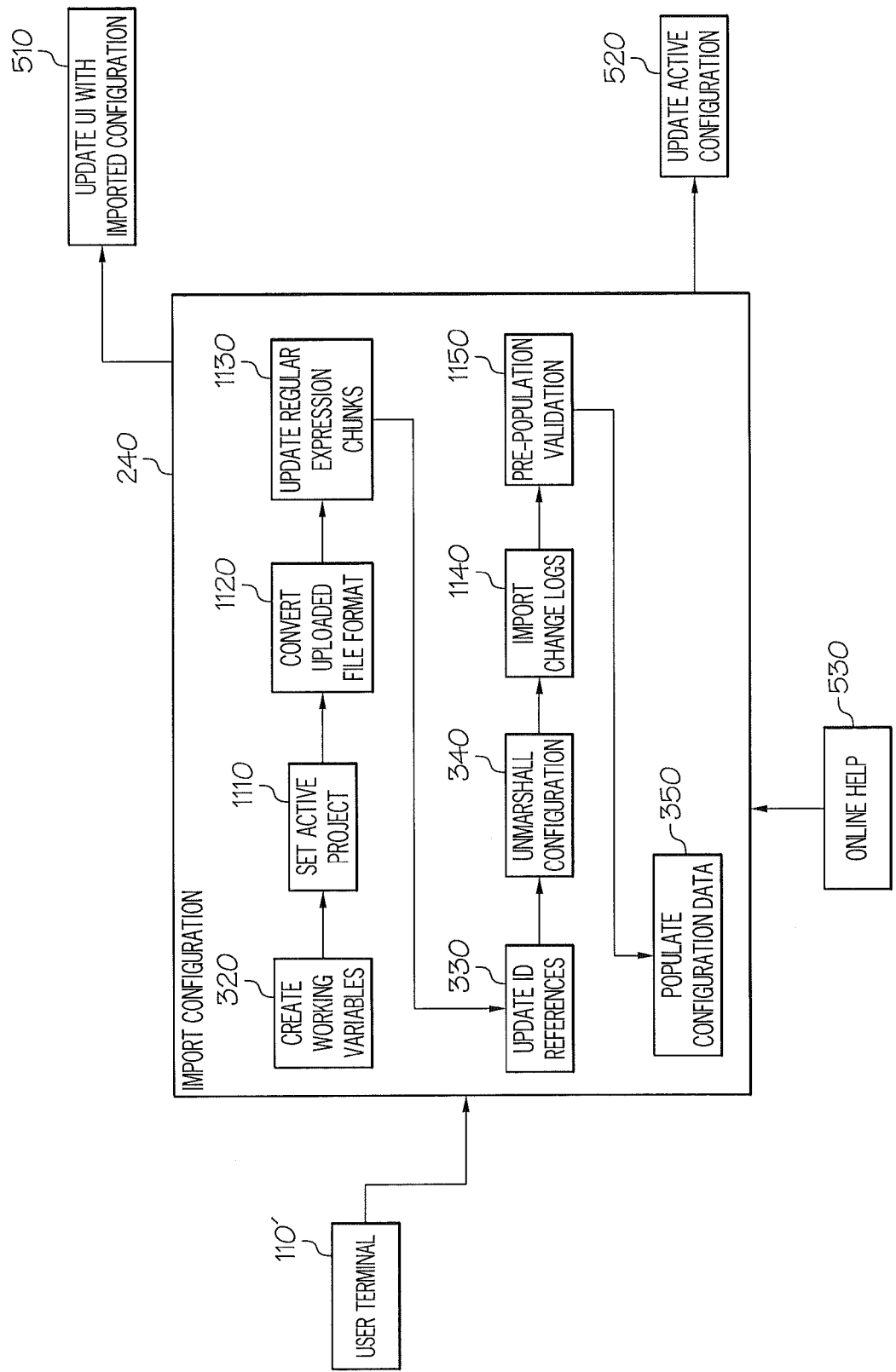

FIG. 11 is a flowchart of operations that may be performed by a metadata importer 240, which may provide a more detailed set of operations than was provided in FIG. 3.

Referring now to FIG. 11, at Block 320, several working variables are required by the import configuration function. These variables are created and initialized here. At Block 1110, the import configuration function further makes several calls to other services within MDB. Some of these services require an "active" project, which is a project which is currently being edited. As the import function does not require the user to enter a project in edit mode, the project into which the new configuration will be imported into is set as the active project. At Block 1120, the configuration which the user wants to import is stored external as a file. This file contains XML but may have .xml, .txt or any other extension type. Internally, the import configuration function further may require the data to be in a string object format, also referred to as an "XML object". The external file is read as a stream and converted to a string. At Block 1130, configurations which are of an older schema version than the current version (2.0) may have an XML data tag of RegularExpression. In order for the imported configuration to be compatible with a version 2.0 schema, these older types of regular expressions are broken down into RegularExpressionChunks if their length exceeds a set value. The XML tags of the item are also changed to comply with schema 2.0 validation rules.

At Block 330, ID references are updated to convert a first set of references IDs in the first XML object to a second set of reference IDs. Reference IDs may be used in MDB. They allow references to MDB elements via the ID reference without having to replicate the entire object structure in the generated XML. When the XML is unmarshalled in the application and a Java class structure is assembled, each ID will reference one object in the configuration. Each ID is unique to the configuration it is in, so if an existing configuration is being imported, then new IDs are generated for each and every existing unique reference and a like for like replacement made in the new configuration. This ensures that when the new object structure is created, existing relationships among objects are preserved.

The configuration to be imported, which is XML format, is said to be marshalled. MDB uses Java class objects to perform any operations on the data. Constructing a Java class structure from the XML is called unmarshalling. An external service may be called to perform this process at Block 340.

At Block 1140, change logs are imported. Change logs are user created pieces of data which provide information about changes made to the configuration. If the user does not require the existing change logs, they can be excluded from the import process.

At Block 1150, pre-population validation is performed. Specifically, prior to populating the new configuration some validation checks can be performed on the structure. If this validation fails, the import process halts and the user is informed of any errors found.

Finally, at Block 350, the configuration data is populated by recursively processing the first object class structure to construct objects and their contents pursuant to the second set of ID references and thereby generate a second object class structure. The unmarshalled configuration goes through a number of processes before it is added to the database. These processes include modifying the existing XML so it is compatible with the current schema and creating items which cannot be directly created from the initial unmarshalling stage.

Importing

Low Level Description

A low level description of importing metadata according to various embodiments described herein will now be provided. This low level description will elaborate upon the blocks of FIG. 11.

FIG. 12 provides additional details of Block 320 of FIG. 11. Specifically, at Block 1210, using Java, variables are created and initialized. These variables will be used throughout the import configuration process.

FIG. 13 provides additional details on converting the uploaded file format, which may correspond to Block 1120 of FIG. 11. The uploaded file format may be converted as follows:

At Block 1300, from the UploadedFile object which was created via the UI, extract an InputStream object. At Block 1310, if an InputStream object was created successfully, then at Block 1320, create a writer object which will be used to hold the results of this process. At Block 1330, create a character buffer array which will hold the contents of the InputStream read. At Block 1340, create a reader object the read the InputStream. At Block 1350, read one line from the InputStream Reader into the buffer array. At Block 1360, if content was found, then at Block 1370, add the buffer contents to the writer result object. Finally, at Block 1380, if no content is found, at Block 1380, extract a string object from the writer object and return this to the calling method.

Figure 14:
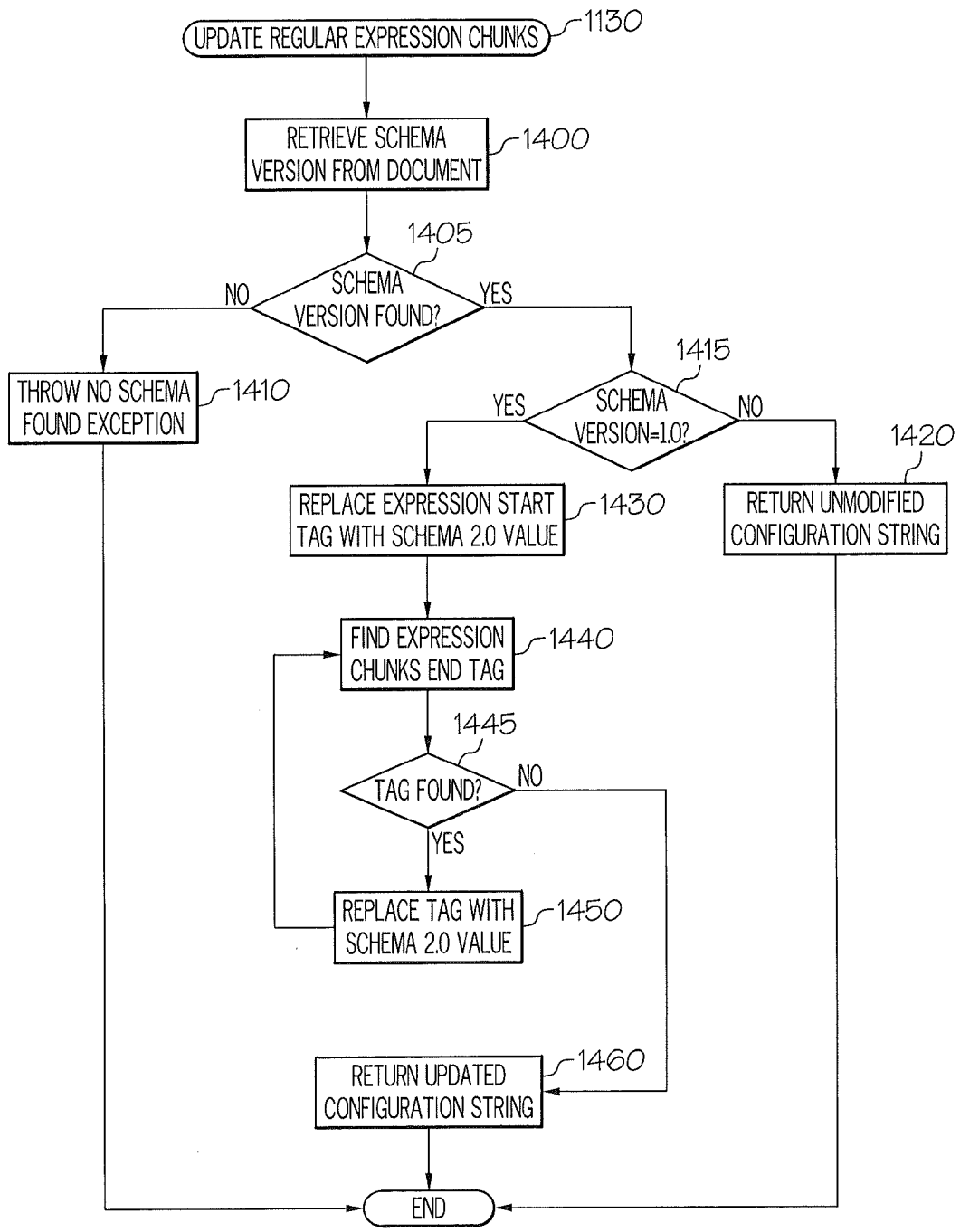

FIG. 14 is a flowchart of operations that may be performed to update regular expression chunks, which may correspond to Block 1130 of FIG. 11. These operations may provide compatibility with the Schema Version 1.0. Specifically, referring to FIG. 14, at Block 1400, retrieve the schema version from the configuration string (imported document). If no schema version is found at Block 1405, then this document is in error and an exception is thrown at Block 1410, which will result in an error message(s) being displayed to the user in the UI. In contrast, if a schema version was found at Block 1405, a test is made at Block 1415 if it is a Schema Version 1.0. If no, then at Block 1420, the schema version is current so no need to process any data. If yes, then at Block 1430, this is a 1.0 schema document, so replace all <mcd-common:RegularExpression>occurrences with <mcd-common:RegularExpressionChunks>. At Block 1440, using regular expressions, process all occurrences of *</mcd-common:ExpressionChunks>*</mcd-common:RegularExpression>. At Block 1445, a test is made as to whether there are unprocessed occurrences of *</mcd-common:ExpressionChunks>*</mcd-common:RegularExpression>remaining. If so, at Block 1450, replace the current occurrence of with </mcd-common:ExpressionChunks> </mcd-common:RegularExpressionChunks>. If not, then at Block 1460, processing is complete so return the updated configuration string.

Figure 15:
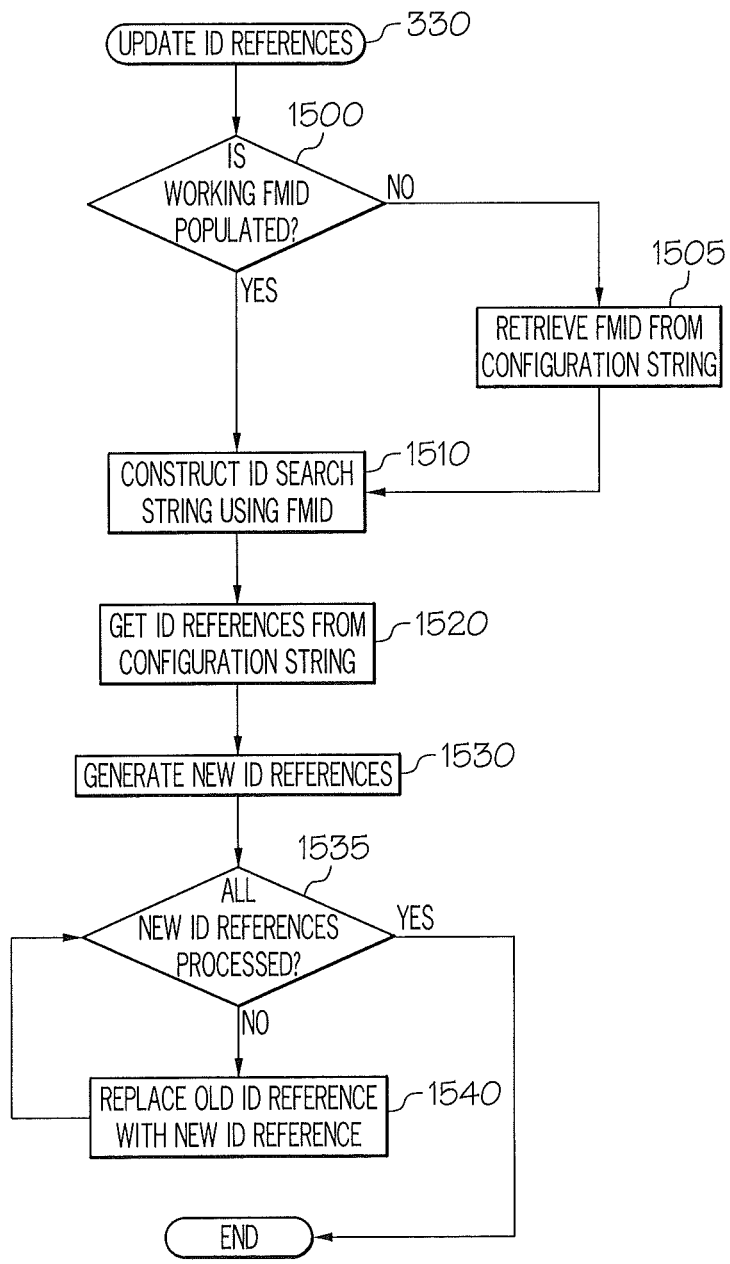

FIG. 15 is a flowchart of operations that may be performed to update ID references, which may correspond to Block 330 of FIG. 11. Referring to FIG. 15, the existing FMID of the original configuration can be overridden with a new value. At Block 1500, a test is made as to whether an override value been supplied by the user. If no at Block 1505, using regular expressions, scan the configuration string for an occurrence of <mcd-cd:FMID>(.*?)</mcd-cd:FMID>. The FMID will be the contents of the (.*?) placeholder. If yes at Block 1500, then at Block 1510, use the override or retrieved FMID value construct a search string by concatenating "id=" with the FMID (e.g. id=ABC0001). At Block 1520, retrieve all occurrences of ID references from the original document. Accordingly, embodiments of Block 1520 may correspond to obtaining working variables for the second metadata and/or the second version of the computer program, which was described, for example, at Block 320. At Block 1530, using the retrieved values, construct new unique ID references. At Block 1535, a test is made as to whether all the generated ID references have been processed. If no, then at Block 1540, using Java String replace commands, replace all occurrences of the old ID reference with the newly generated one. If yes, operations end. Accordingly, operations of FIG. 15 can convert a first set of ID references in the first XML object to a second set of ID references.

Figure 16:
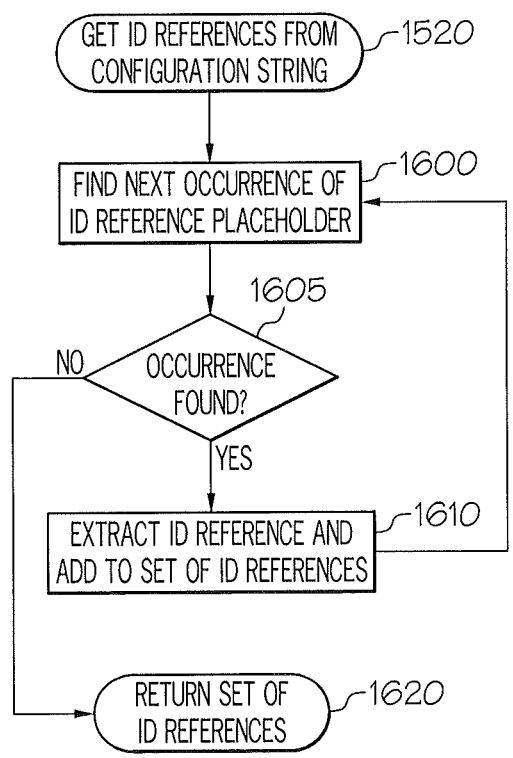

FIG. 16 is a flowchart of operations that may be performed to get ID references from a configuration string, which may correspond to Block 1520 of FIG. 15. Referring to FIG. 16, at Block 1600, process all occurrences of ID reference placeholder in configuration string. If an unprocessed occurrence is found at Block 1605, then at Block 1610, using regular expression, extract the ID reference from the placeholder occurrence (e.g. given a found placeholder of "id=ABC0001.RES1234", the ID reference is "RES1234"). If not, at Block 1620, return the ID references to the calling method. Accordingly, operations of FIG. 16 can obtain working variables for the second metadata and/or the second version of the computer program product.

Figure 17:
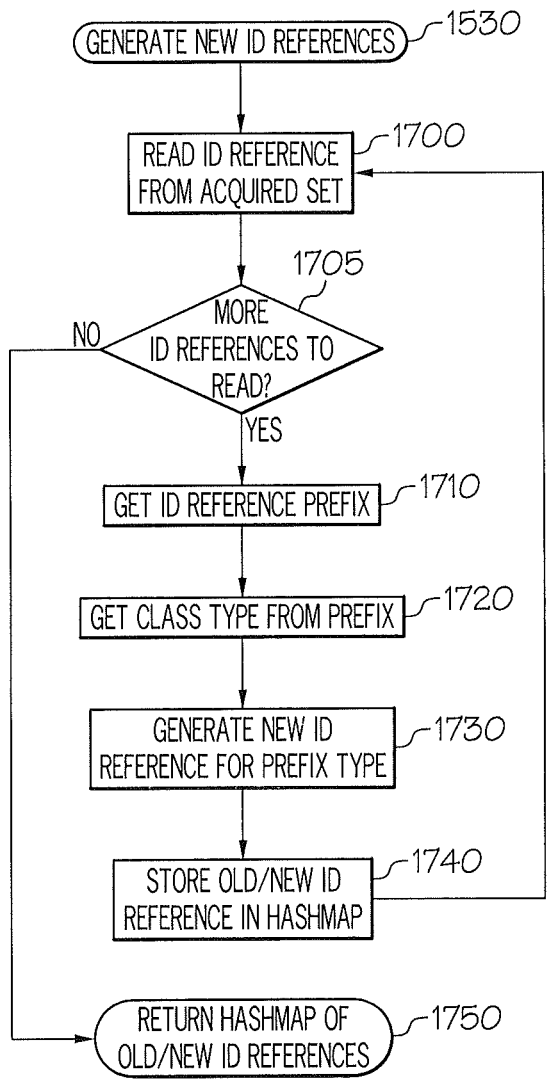

FIG. 17 is a flowchart of operations that may be performed to generate new ID references, which may correspond to Block 1530 of FIG. 15. Referring to FIG. 17 at Block 1700, from the previously acquired collection of existing ID references, process each one. At Block 1705, a test is made whether all existing ID references have been processed. If yes, then at Block 1710, extract the ID prefix (a 3 letter alphanumeric code) from the ID reference. At Block 1720, determine the class type of the object using the extracted prefix. At Block 1730, generate a new unique ID reference using the class type and prefix. At Block 1740, store the old and new ID references in a hashmap for later processing. After operations of Block 1740 are completed, control is returned to Block 1700 to process the next ID reference from the collection. At Block 1750, all ID references have been processed to return the populated hashmap to the calling method.

Figure 18:
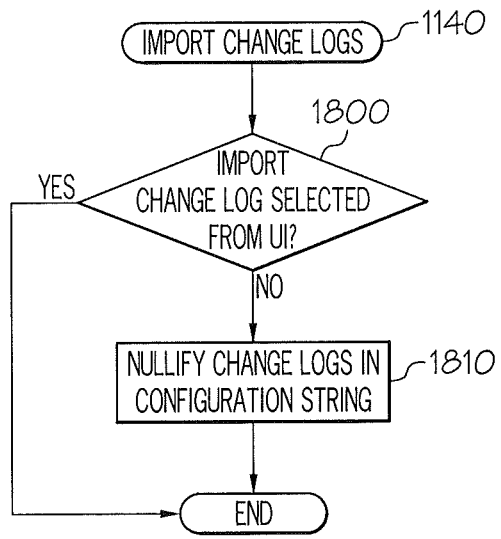

FIG. 18 is a flowchart of operations that may be performed to import change logs, which may correspond to Block 1140 of FIG. 11. Referring now to FIG. 18, at Block 1800, a test is made as to whether the user has opted to use the original change logs in the new configuration. If no, at Block 1810, no logs should be imported into the new configuration so nullify the item in the configuration object. If yes, operations are complete.

Figure 19:
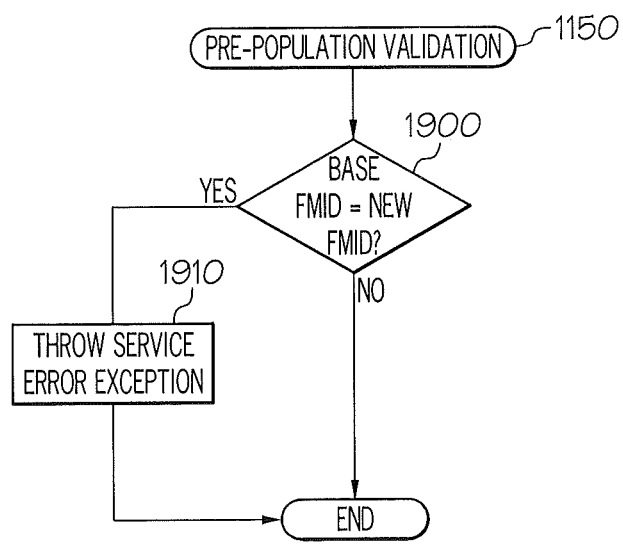

FIG. 19 is a flowchart of operations that may be performed for pre-population validation, which may correspond to Block 1150 of FIG. 11. Referring to FIG. 19, at Block 1900, a determination is made as to whether the base FMID in the original configuration is the same as the FMID of the new configuration. If yes, then at Block 1910, this is not allowed, so throw an exception which will be presented as an error message in the UI.

Figure 20:
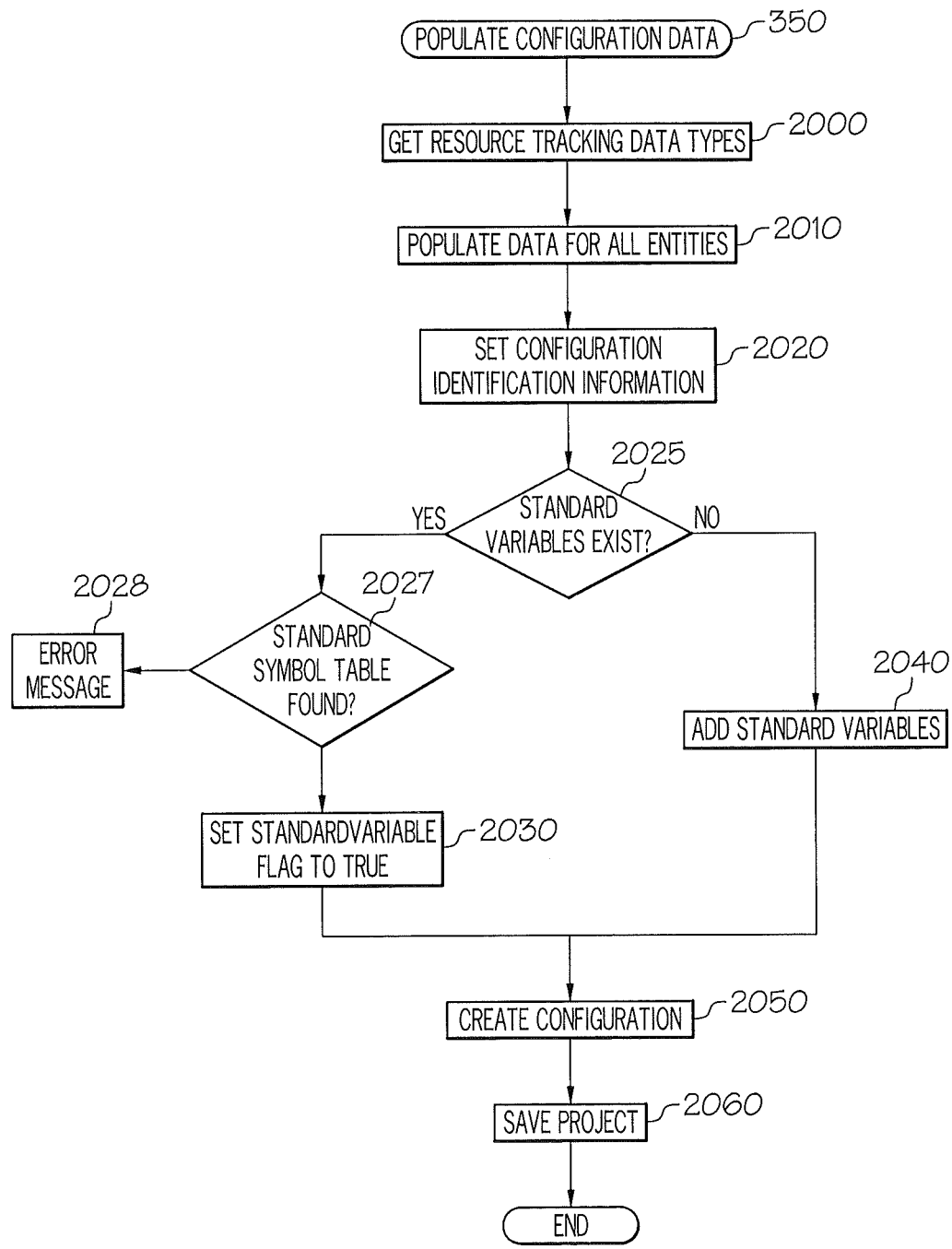

FIG. 20 is a flowchart of operations that may be performed to populate the configuration data, which may correspond to Block 350 of FIG. 11. Referring to FIG. 20, at Block 2000, a collection of Resource Tracking Data Types is retrieved from the original configuration. This may be needed, because these elements do not have any direct ID reference link, so the correct object relationship may not be automatically recreated.

At Block 2010, using the newly generated ID references and the existing resource tracking data types, the new configuration object is populated. At Block 2020, the new configuration identification details are set with the existing and/or overwritten details. At Block 2025, a determination is made as to whether the configuration contains a standard variable object type. If yes, then at Block 2027, a determination is made as to whether a standard symbol table is included and, if so, the standard variable table is set to TRUE at Block 2030. If not, an error message is sent at Block 2028. On the other hand, if no standard variables exist at Block 2025, then at Block 2040, a call is made to an external service to add standard variables to the configuration. At Block 2050, the configuration is now ready, so using these details, a configuration object structure is created which is suitable for persisting to a database. At Block 2060, a configuration is part of the project, so the configuration is added to the project, which was selected by the user in the user interface.

Figure 21:
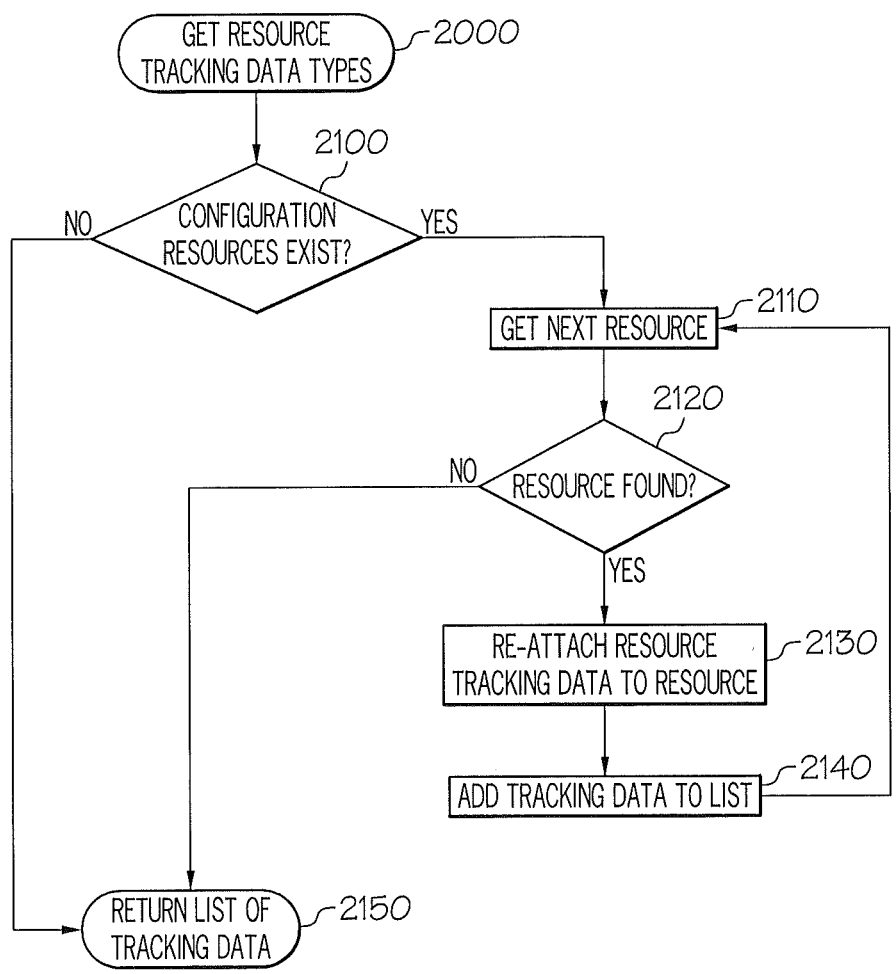

FIG. 21 is a flowchart of operations that may be performed to get resource tracking data types, which may correspond to Block 2000 of FIG. 20. Referring now to FIG. 21, at Block 2100, a determination is made as to whether the configuration contains resource type objects. If yes, at Block 2110, retrieve a resource from the configuration. A test is made at Block 2120 as to whether there are unprocessed resources. If yes, then at Block 2130, reattach the tracking data contained within the resource to the entity manager. At Block 2140, add the tracking data to a collection of all tracking data items. When all resources (if any) have been processed at Block 2120, return the collection of tracking data items to the calling method at Block 2150.

Figure 22A:
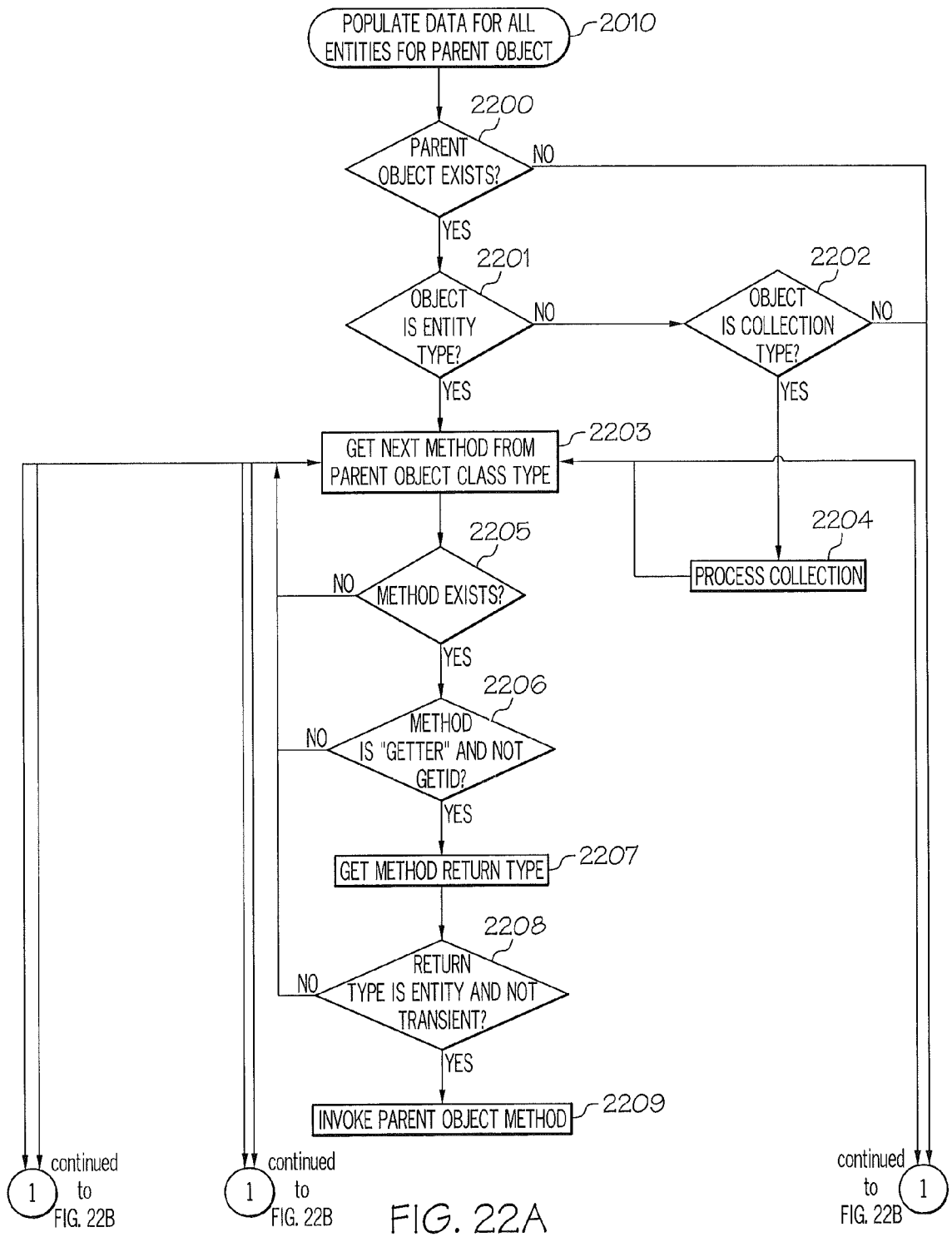
Figure 22B:
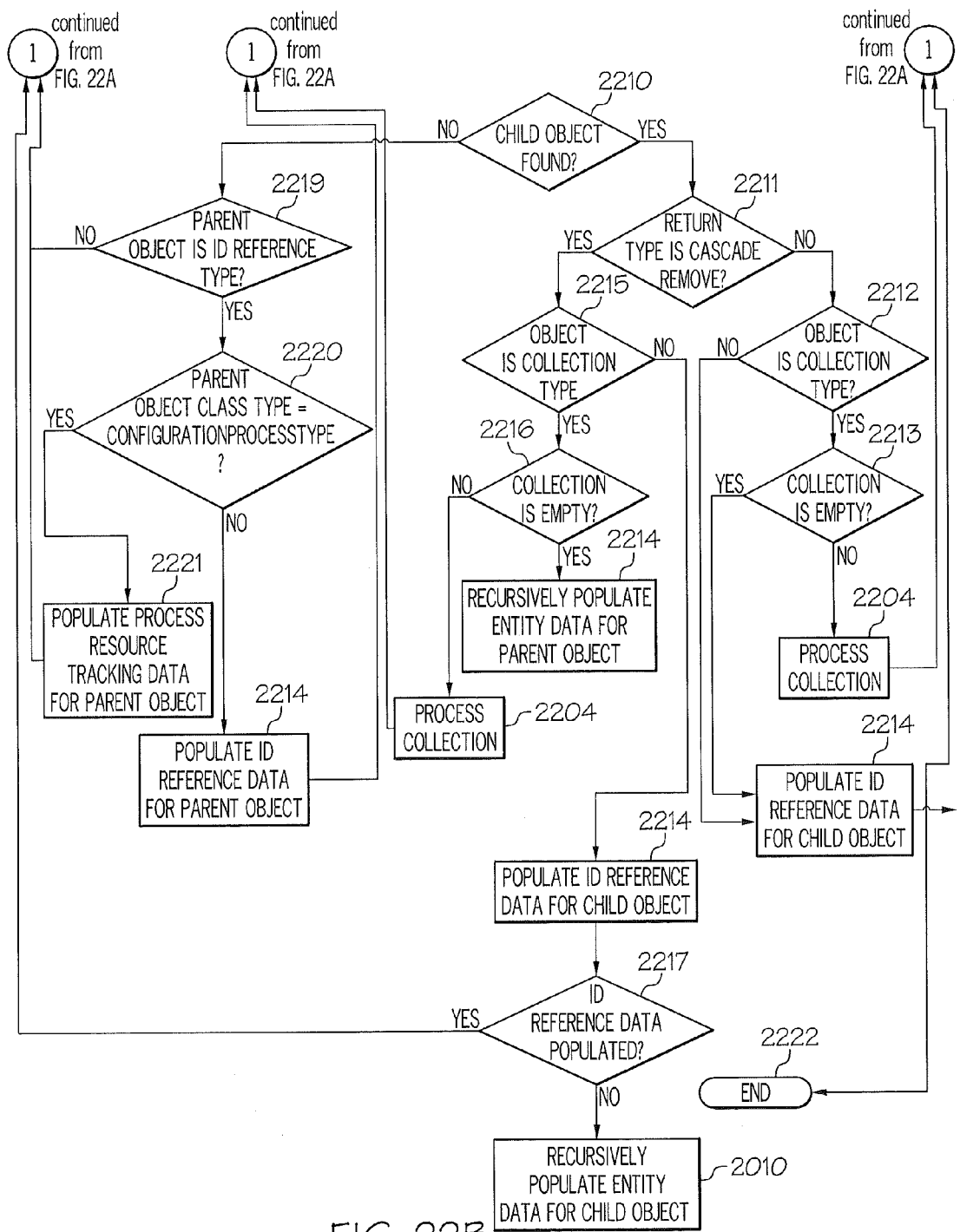

FIGS. 22A-22B, which will be referred to herein collectively as FIG. 22, is a flowchart of operations that may be performed to recursively populate the data for all entities contained within a parent object, which may correspond to Block 2010 of FIG. 20. In general, embodiments of FIG. 22 can recursively process the first object class structure to construct objects and their contents pursuant to the second set of ID references, and thereby generate a second object class structure, as was described in connection with Block 350 of FIG. 3, and as will be described in greater detail in connection with FIG. 27 below. More specifically, the recursive processing takes place by traversing the first object class structure to identify an object therein that contains a member of the second set of ID references, which may correspond to Block 410 of FIG. 4, and may be embodied by Blocks 2200-2201 herein. Methods of the object that was identified are called, to populate the content of the object that was identified using the member of the second set of ID references, as was described, for example, at Block 420 of FIG. 4, and which may be embodied in Blocks 2203-2217 of FIG. 22. The traversing and the calling are repeated until the objects in the first object class structure have been processed, as was described at Block 430 of FIG. 4.

Unlike the operations described in connection with FIG. 15, a simple "find and replace" cannot be performed, because the object class hierarchy of the metadata may contain references to other objects in any portion of the hierarchy. Thus, ID references can occur everywhere and anywhere in the object hierarchy, and are not confined to a given branch of the hierarchy. The new metadata must maintain referential integrity.

"Cascade rules" may be provided as referential integrity rules. The cascade rules indicate when to delete objects below a given object in an object hierarchy. Cascade rules also can indicate when reference IDS need not be changed because they were already changed. Thus, cascade rules indicate how to resolve reference IDs and when to stop resolving reference IDs. Accordingly, operations of FIG. 22 process each object. When operations get to a point when a candidate branch is found, it calls itself down through the levels until it hits one of a given set of terminating conditions that are described in detail below. It then stops processing that branch, works itself back up until it has processed every point in the object tree.

Referring to FIG. 22, at Block 2200, a parent object is identified for further processing. At Block 2201, a test is made as to whether the parent object from the object that is being processed is an "entity" object type. The entity object type is a persistable object which can be processed. At Block 2202, if the parent object is not an entity object type, a test is made as to whether it is a "collection". Since a collection may include a list, map or set of multiple objects, the collection object needs to be broken down and each member of the collection must be processed. At Block 2203, if the parent object is an entity, then Java reflection may be used to process all the public methods from the parent object class type. At Block 2204, if the parent object is a collection, each element in the collection is processed.

At Block 2205, a test is made as to whether the parent object has a method that has not yet been processed and, if so, at Block 2206, a test is made as to whether the method name is prefixed with "get" and is not annotated with "@ID". In some embodiments, the @ID identifier refers to an internal identifier that is not public, and may be ignored. At Block 2207, the return type of the method is obtained, and at Block 2208 a test is made as to the return type is an entity and not a transient object. If this is the case, then at Block 2209, the method on the object that is being processed in invoked, and a Child Object (CO) is returned. This identifies a possible candidate for reference ID replacement.

At Block 2210, a test is made as to whether the invocation of the method returned the object. If not, processing need not proceed further down the hierarchy. If yes, at Block 2211, the parent object class method annotation is checked for an occurrence of the JAXB annotation CascadeType.ALL or CascadeType.REMOVE, in order to determine whether processing should continue down the branch or should stop, respectively. At Block 2212, if CascadeType.ALL or CascadeType.REMOVE is present, then a determination is made as to whether the child object is also a collection type, and at Block 2213, if it is a collection type, a test is made as to whether it is empty. At Block 2204, if the collection is not empty, then each element of the collection is processed. At Block 2214, if it is not a collection, then the ID reference is populated for the child object using the value supplied to this method. Thus, at Block 2214, the traversing of the object hierarchy has gone as low as it can, and the ID reference is populated.

Alternatively, if the return type is a CascadeType.ALL at Block 2211, then at Block 2213, CascadeType.ALL or CascadeType.REMOVE is present on the parent object class method and a test is made as to whether it is a collection. Again, at Block 2214, it is not a collection, so the ID reference data for the child object is populated using the value supplied by this method. At Block 2217, a test is made as to whether the ID reference was populated and, if not, then at Block 2010, ID reference was not populated, so that a recursive call to this method for the child object is made using the ID reference and the tracking details.

Returning again to Block 2210, if a child object was not found, then a determination is made at Block 2219 if the parent object is an ID reference type of object. If so, a test is made at Block 2220 as to whether the parent object class type is a ConfigurationProcessType. This is a special case for tracking data. If so, at Block 2221, the process resource tracking data is populated for the parent object (ConfigurationProcessType).

In summary, operations of FIG. 22 can perform check, validate and "replace and continue", or "replace and start or stop", until the entire object hierarchy has been traversed.

Figure 23A:
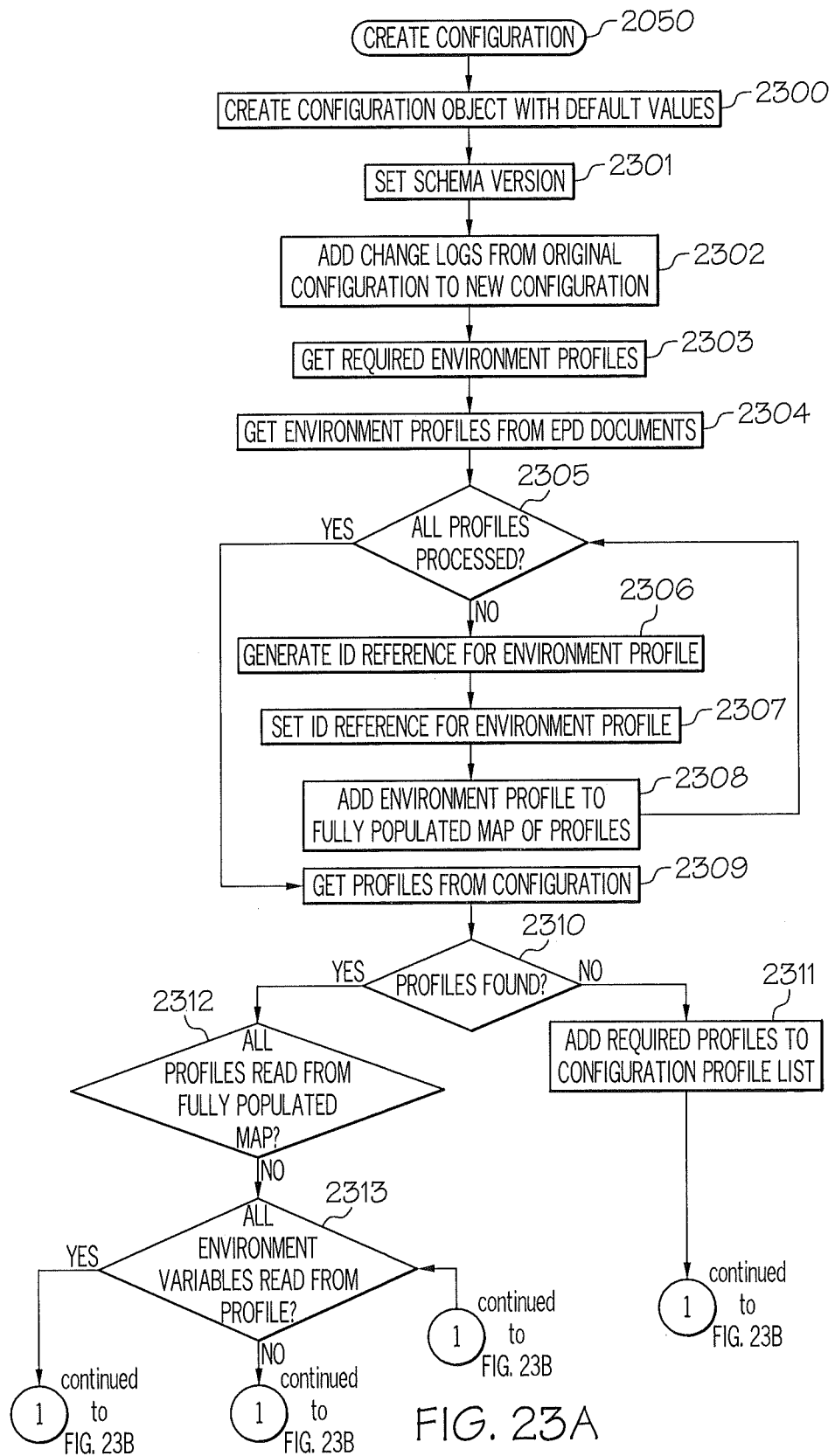
Figure 23B:
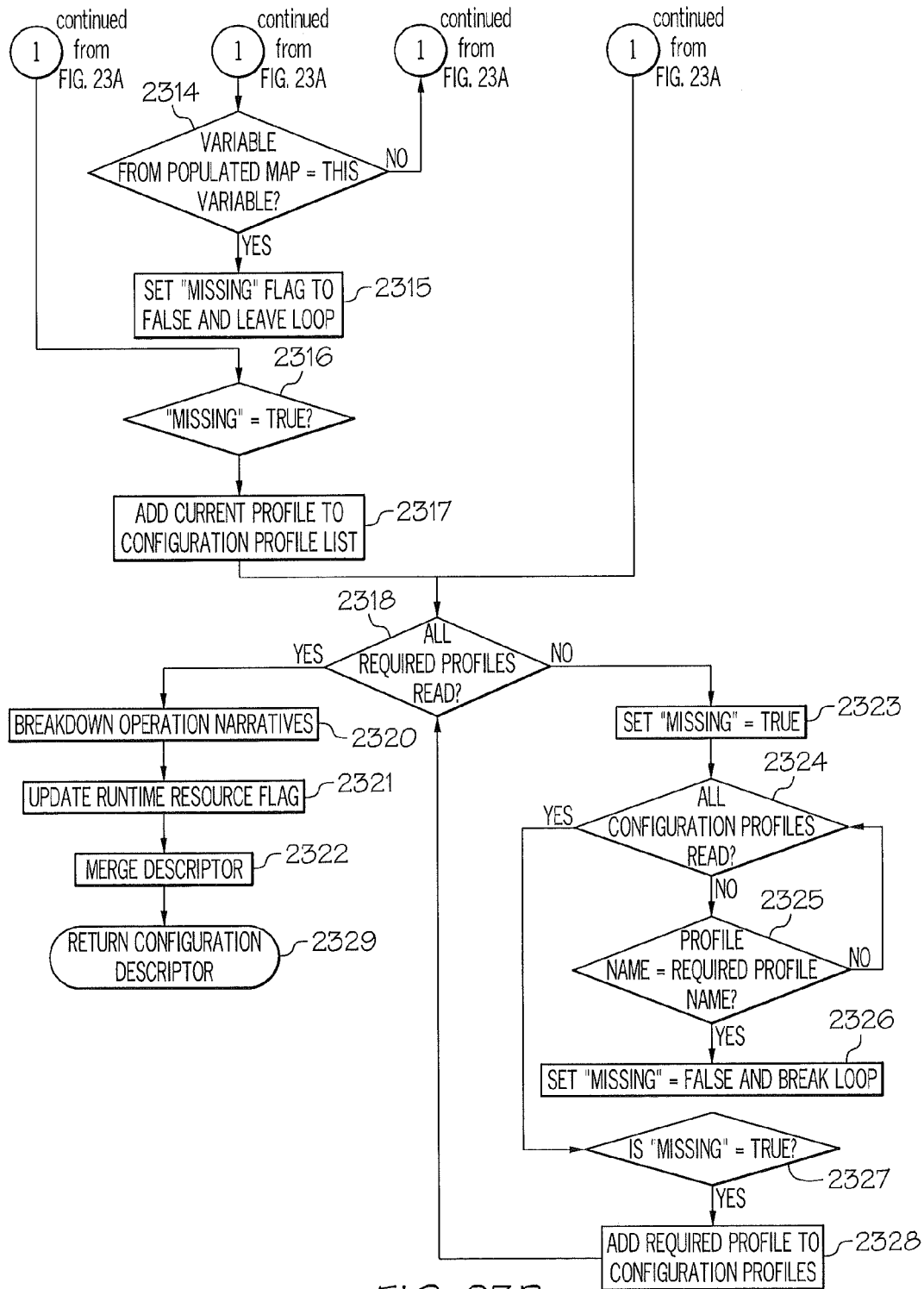

FIGS. 23A-23B, which will be referred to herein collectively as FIG. 23, is a flowchart of operations that may be used to create a configuration, which may correspond to Block 2050 of FIG. 20. Block 2300 creates a configuration object with default values using a factory method. Block 2301 sets the schema version to the current schema version. At Block 2302, if requested, set the original change logs as the current change logs. At Block 2303, from the file system, retrieve a list of Required Environment Profiles (REPs). At Block 2304, from the file system, retrieve all environment profiles from the EPD documents. At Block 2305, a test is made whether all the EPD profiles have been processed. At Block 2306, they have not, so for the Current Environment Profile (CEP) generate a new ID reference. At Block 2307, set the ID reference for CEP. At Block 2308, add CEP to a collection of Fully Populated Profiles (FPP).

If all profiles have been processed at Block 2305, then at Block 2309, retrieve all EPs from the current Configuration (EP). At Block 2310, a test is made whether there are profiles present. If there are not, at Block 2311, add the REPs to the (empty) Configuration Profiles (CP). A test is made at Block 2312 as to whether all the profiles from the FPP have been processed, and a test is made at Block 2313 as to whether all the profiles from EP have been processed. If not, then at Block 2314, a test is made whether the FPP element=EP element. If yes, then at Block 2315, it is not missing from the list, so quit processing the FPP element. On the other hand, at Block 2316, if all EPs have been processed and is missing, then at Block 2317, add the FPP to the CP list. At Block 2318, a test is made whether all the REPs have been processed.

At Block 2320, operations are performed to break down the operation narratives (description text object). At Block 2321, operations are performed to update RuntimeResource flag for configuration resources. At Block 2322, operations are performed to attach the new configuration object to the entity manager to all it to be persisted to the DB.

Returning to Block 2318, if all required profiles are not read, then at Block 2323, by default, a profile is said to be missing (until found). At Block 2324, a test is made whether the EPs have been processed. At Block 2325, a test is made whether the EP element name=REP name. At Block 2326, if yes, then this is not missing, so do not continue processing this REP element. In contrast, at Block 2327, it is not found in the EP list, so it is missing. At Block 2328, add the REP to the CP list. Finally, at Block 2329, return the new Configuration object to the calling method.

Figure 24:
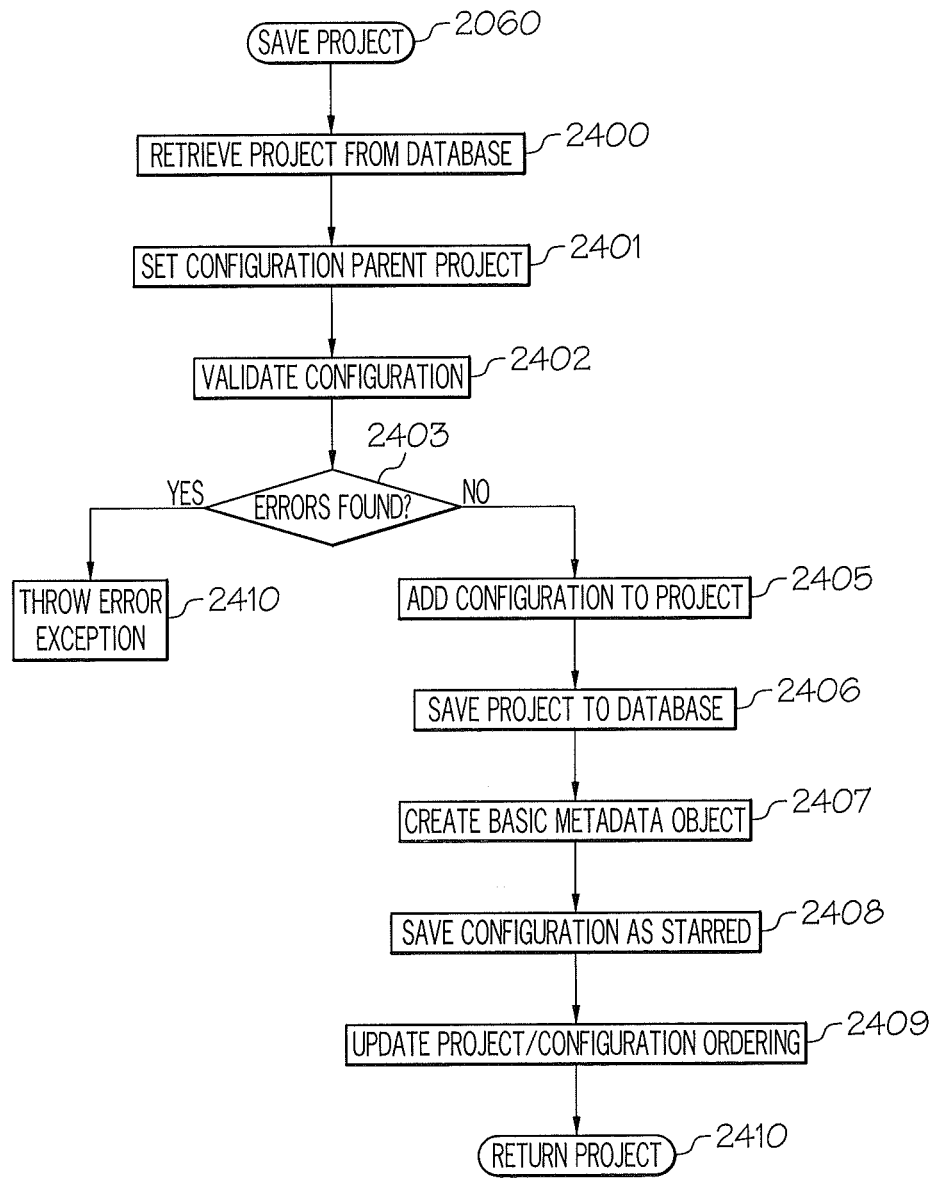

FIG. 24 is a flowchart of operations that may be performed to save a project, which may correspond to Block 2060 of FIG. 20. Referring now to FIG. 24, at Block 2400 operations are performed to retrieve the project selected by the user in the UI from the database. At Block 2401, set the retrieved project as this configuration's parent project. At Block 2402, validate the configuration. At Block 2403, a test is made whether the configuration contains errors. If yes, at Block 2410, throw an error exception with will be present as error messages in the UI. If not, then at Block 2405, add the new configuration to the project, persist the project to the database (Block 2406), create a Basic Metadata Object (BMO) based on the new configuration (Block 2407), use the BMO to mark this configuration as starred (a "favorite") in the UI Block 2408) and insert the new configuration into the correct position in Project Configuration list (Block 2409. The order may be user selected.

Figure 25:
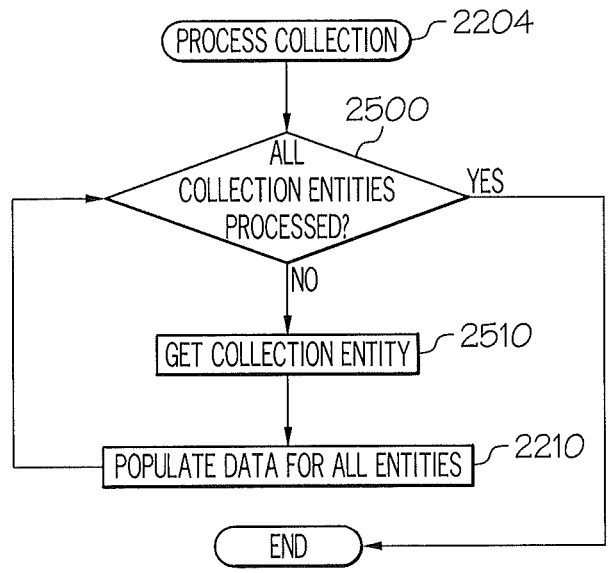

FIG. 25 is a flowchart of operations that may be performed to process a collection, which may correspond to Block 2204 of FIG. 22. Referring to FIG. 25, at Block 25, a test is made whether all entries in the collection have been processed. If not, at Block 2510, get the current entry from the iterated collection, and at Block 2210, recursively process all details in the current collection entry.

Figure 26:
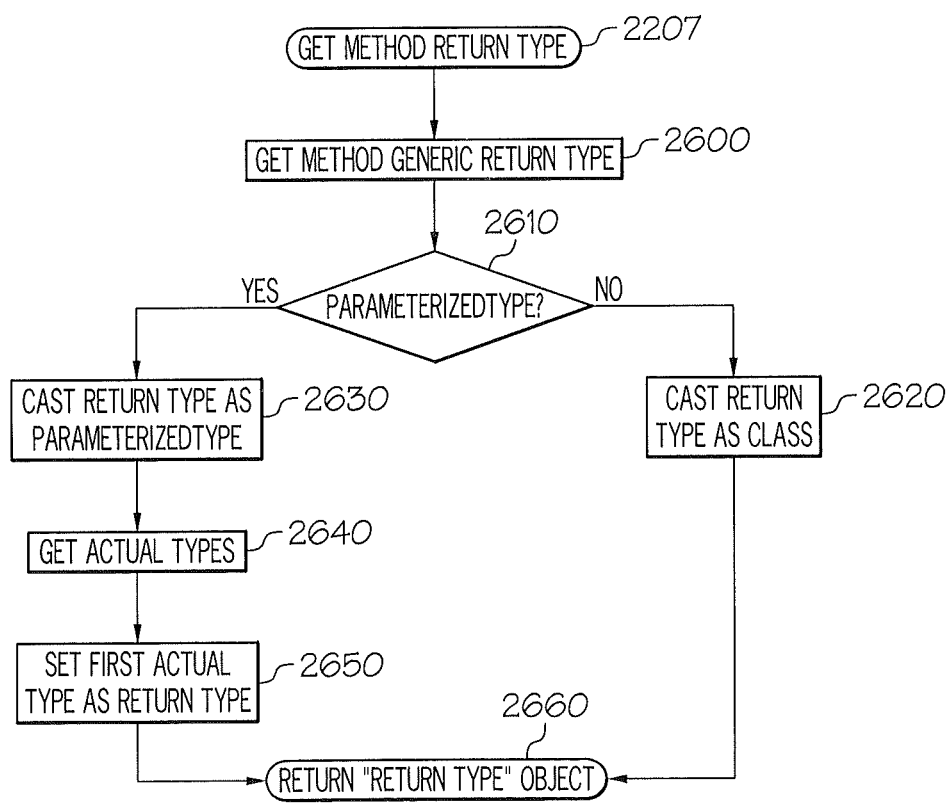

FIG. 26 is a flowchart of operations that may be performed to get a method return type, which may correspond to Block 2207 of FIG. 22. Referring to FIG. 26, at Block 2600, get the generic return type for the method passed as a parameter. At Block 2610, a test is made as to whether the return type is parameterized (ParameterizedType represents a parameterized type such as Collection<String>). If not, at Block 2620, the return type is not parameterized so cast the return type to a return object RO as type class. Alternatively, if yes, then at Block 2630, the return type is parameterized to cast as a ParameterizedType. At Block 2640, retrieve the actual types of the object parameters into a type[ ] array. At Block 2650, the first element of the array is the required return type so cast it to variable RO as type class. Finally, at Block 2660, return RO to the calling method.

Figure 27:
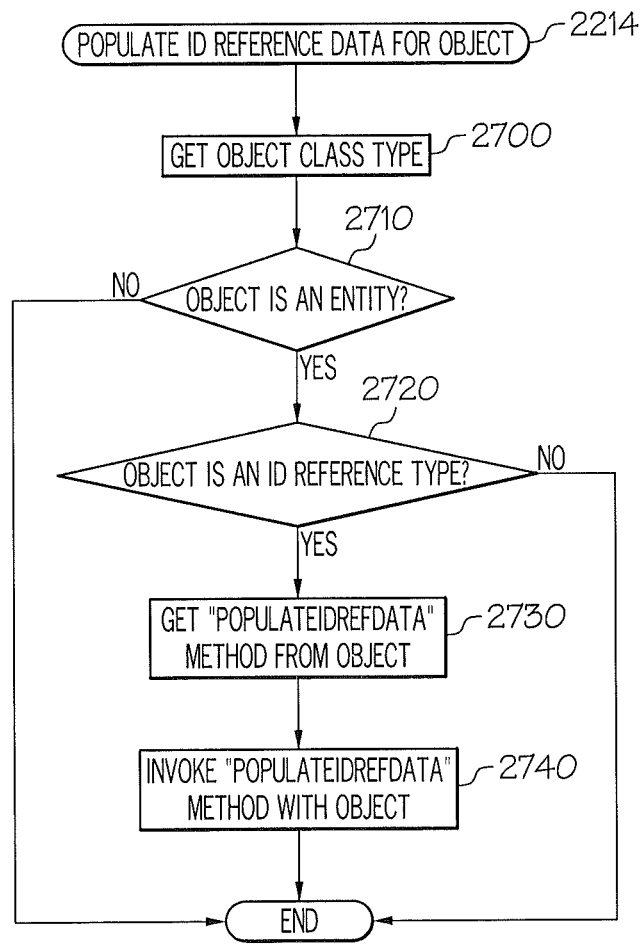

FIG. 27 is a flowchart of operations that may be performed to populate the ID reference data for an object, which may correspond to Block 2214 of FIG. 22. Referring to FIG. 27, at Block 2700, get the class type of the object passed as a parameter to this method. At Block 2710, a test is made whether the object is an entity class type. At Block 2720, a test is made whether the entity is also an ID reference type. If yes, then at Block 2730, using Java reflection, retrieve the populateIDReferenceData method from the object and at Block 2740, invoke the method on the Object using the ID reference details passed in as parameters to this method.

Figure 28:
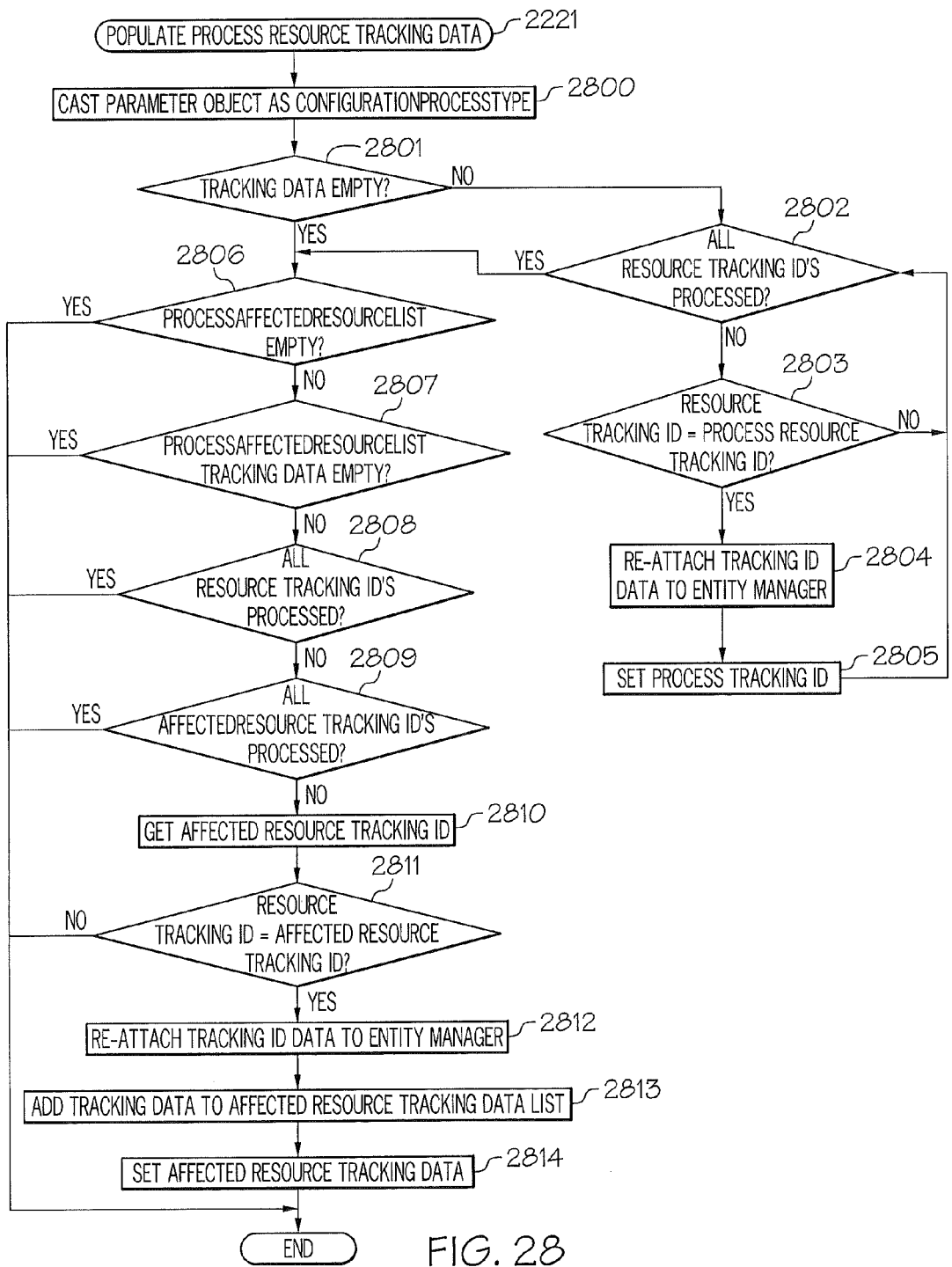

FIG. 28 is a flowchart of operations that may be performed to populate process resource tracking data, which may correspond to Block 2221 of FIG. 22. Referring to FIG. 28, at Block 2800, the parameter object is cast as a ConfigurationProcessType Process Object (PO). At Block 2801, a test is made as to whether the resource tracking data element of the PO is empty. If not empty, at Block 2802, a test is made as to whether all resource tracking IDs that passed into this method have been processed. If not, then at Block 2803, a test is made as to whether the PO Resource Tracking ID (RTID) is current. At Block 2804, if yes, then the tracking ID is reattached to the entity manager, so that it can be persisted to the database, and at Block 2805, the PO tracking ID is set to the current RTID.

Referring again to Block 2802, if all RTIDs have already been processed, then at Block 2806, a test is made as to whether the ProcessAffectedResourceList is empty, and at Block 2807, a test is made as to whether the ProcessAffectedResourceList tracking data is empty. A test is made at Block 2808 if all resource tracking IDs are processed, and at Block 2809, a test is made as to whether all AffectedResource tracking IDs are processed. If the results of any of the tests at Block 2806, 2807, 2808 or 2809 is yes, then operations end and processing returns to the calling block. At Block 2810, the AffectedResource tracking ID is obtained, and at Block 2811, a test is made as to whether the resource tracking ID=AffectedResource tracking ID. If so, then the tracking ID data is attached to the entity manager at Block 2812, and at Block 2813, the tracking data is added to the AffectedResource tracking data list. Finally, at Block 2814, the AffectedResource tracking data is set.

Figure 29:
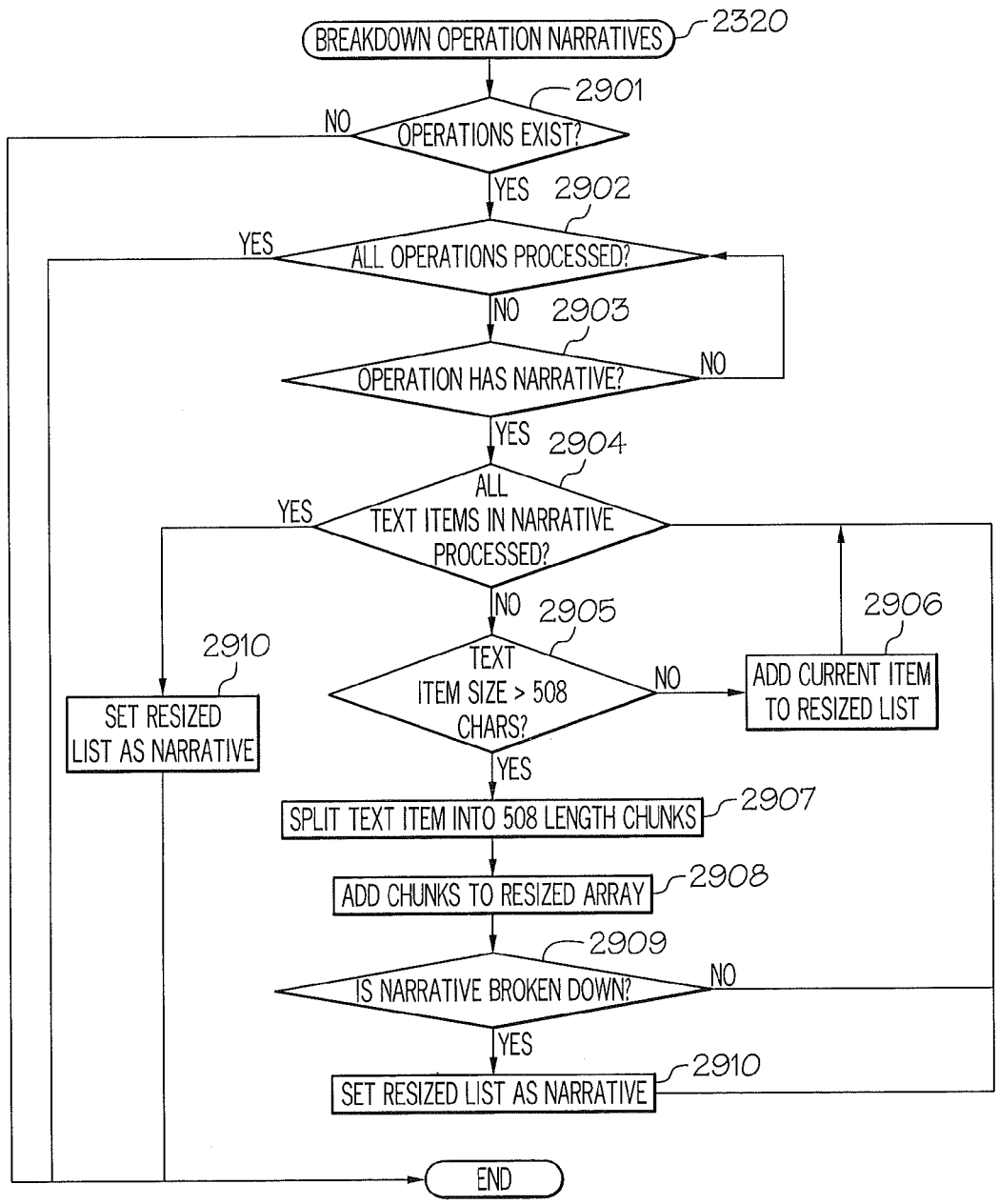

FIG. 29 is a flowchart of operations that may be performed to break down operations narratives, which may correspond to Block 2320 of FIG. 23. Referring to FIG. 29, at Block 2901, a test is made whether this configuration contains operations. If yes, at Block 2902, have all the operations been processed? If no, then at Block 2903, does the current operation being processed (OP) have an operation narrative? If yes, then at Block 2904, have all the text items in the narrative been processed? If no, then at Block 2905, is the length of the text contained in the Current Text Item (CTI)>508 characters? If no, then at Block 2906, there is no need to modify this CTI, add it to the list of Processed Text Items (PTD). If yes, then at Block 2907, split the CTI into segments of maximum 508 characters, and at Block 2908, add the segments to the PTI. Finally, at Block 2909, if the CTI was broken down into smaller chunks/segments, set the narrative element to contents of the PTI (Block 2910).

Figure 30:
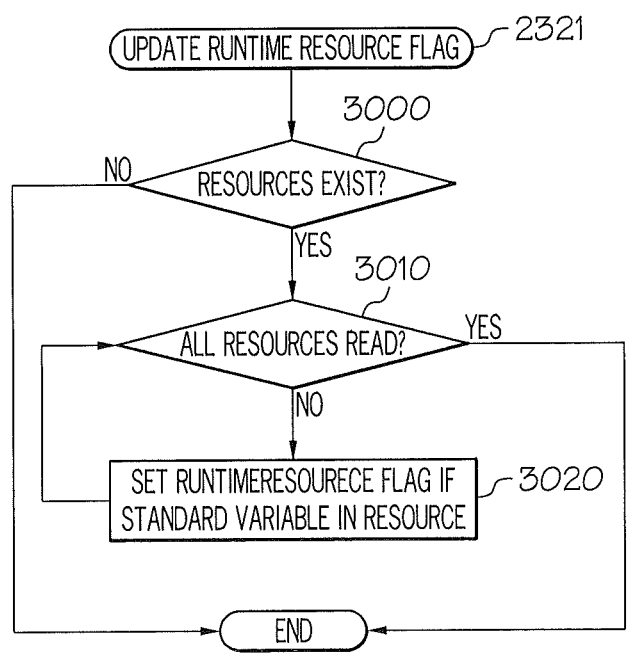

FIG. 30 is a block diagram of operations that may be performed to update RuntimeResourceFlag, which may correspond to Block 2321 of FIG. 23. Referring now to FIG. 30, at Block 3000, a test is made as to whether this configuration contains resources. If yes, then a test is made at Block 3010 as to whether all resources have been processed. if not and the current resource being processed is a Standard Variable resource, then at Block 3020, the RuntimeResource flag is set to "true". Operations continue until all resources are read at Block 3010.

EXAMPLES

The following examples shall be regarded as merely illustrative and shall not be construed as limiting the invention.

Two examples will now be provided to illustrate how reference IDs are used according to various embodiments described herein. Example 1 is a general example, and Example 2 is a more specific example of the operations that are performed in connection with FIG. 22.

Example 1

This example will illustrate how reference IDs are used according to various embodiments described herein. Assume the following XML snippet which is for a Dataset Resource:

```
<mcd-crd:ConfigurableResource recoverable="false">
    <mcd-crd:ResourceName>RES_A1</mcd-crd:ResourceName>
    <mcd-common:Description>dfsdf</mcd-common:Description>
    <mcd-common:ToolTip>dvdfdf</mcd-common:ToolTip>
    <mcd-crd:Dataset id="AAAAAAA.DS001263">
        <mcd-crd:DatasetDefinition>
            <mcd-dd:MvsDataset dummy="false" temporary="false"
        dsname="AAAA"/>
        </mcd-crd:DatasetDefinition>
    </mcd-crd:Dataset>
    <mcd-crd:ResourceTrackingData hasBeenConfirmed="false"
maintenanceSensitiveResource="false"
        <mcd-crd:ResourceTrackingID>RES_A1</mcd-
    crd:ResourceTrackingID>
        <mcd-crd:ResourceScope scope="INSTANCE"/>
        <mcd-crd:ResourceLevel>0</mcd-crd:ResourceLevel>
        <mcd-crd:ResourceTargetLevel>0</mcd-crd:ResourceTargetLevel>
    </mcd-crd:ResourceTrackingData>
</mcd-crd:ConfigurableResource>
```

The section "AAAAAAA.DS001263" is this resource's ID reference:

AAAAAAA=the FMID of the configuration (Function Modification IDentifier)

The "." is a separator.

DS is a hard coded prefix for the object type.

Other prefix types are:

OP, OR, AC, EV, DV, PV, DS, DG, LI, CD, VL, PL, PP, JP, VT, DR, DM, SR, CO, ST, PRC, SV.

The prefix is between FMID and generated number (example: * "[A-Z] {1} [A-Z,0-9]{6}.ST[0-9] {0,6}", prefix is "ST"). The prefix must be exactly 2 characters long, except for processes (PRC).

000724 is an internally assigned sequential number.

Suppose there is an operation action which needs to reference the above dataset. In the UI, it is all done in a user friendly, by-name method (RES_A1). There is no mention of IDs in the UI. The following is the XML snippet for the action that was modified:

```
<mcd-od:Action recoverable="false" id="AAAAAAA.AC000728">
    <mcd-ad:ActionDisplayText>GEX1</mcd-ad:ActionDisplayText>
    <mcd-common:Description>sdsd</mcd-common:Description>
    <mcd-common:ToolTip>asdasd</mcd-common:ToolTip>
    <mcd-ad:ActionServiceRequest>
        <mcd-srd:GenericExecuteService>
            <mcd-srd:ProgramName>ASSEE</mcd-srd:ProgramName>
            <mcd-srd:ProgramLibrary datasetAllocationType="static"
            datasetUsageType="INPUT" ddname="DYNAMIC">
                <mcd-srd:Entry>
                    <mcd-srd:LibraryIDRef>AAAAAAA.LI003952</mcd-srd:LibraryIDRef>
                </mcd-srd:Entry>
            </mcd-srd:ProgramLibrary>
            <mcd-srd:InputDataset datasetAllocationType="static"
            datasetUsageType="INPUT" ddname="SYSIN">
                <mcd-srd:Entry>
                    <mcd-srd:DatasetIDRef>AAAAAAA.DS000724</mcd-srd:DatasetIDRef>
                </mcd-srd:Entry>
            </mcd-srd:InputDataset>
        </mcd-srd:GenericExecuteService>
    </mcd-ad:ActionServiceRequest>
</mcd-od:Action>
```

The section "AAAAAAA.AC000728" is the ID reference of the action itself. Any other objects (also referred to as entities) which reference this action will only use the ID reference. The section "AAAAAAA.LI003952" is a reference library. The section "AAAAAAA.DS000724" is the dataset that was described above. Note the only thing required in the XML is the reference. The application is able to reconstitute the object and display it in the UI using only this number.

Example 2

This example will run through an import, as was illustrated in FIG. 22, using similar examples as Example 1. Here is the Dataset Resource: RESOURCE_A with ID:

```
AAAAAAA.DS047557
    <mcd-crd:ResourceName>RESOURCE_A</mcd-crd:ResourceName>
    <mcd-common:Description>RESOURCE_A</mcd-common:Description>
    <mcd-common:ToolTip>RESOURCE_A</mcd-common:ToolTip>
    <mcd-crd:Dataset id="AAAAAAA.DS047557">
        <mcd-crd:DatasetDefinition>
            <mcd-dd:MvsDataset dummy="false" temporary="false"
            dsname="DS_A"/>
        </mcd-crd:DatasetDefinition>
    </mcd-crd:Dataset>
    <mcd-crd:ResourceTrackingData hasBeenConfirmed="false"
    maintenanceSensitiveResource="fal
        <mcd-crd:ResourceTrackingID>RES_A_Tracking_ID</mcd-crd:ResourceTrackingID>
        <mcd-crd:ResourceScope scope="INSTANCE"/>
        <mcd-crd:ResourceLevel>0</mcd-crd:ResourceLevel>
        <mcd-crd:ResourceTargetLevel>0</mcd-crd:ResourceTargetLevel>
    </mcd-crd:ResourceTrackingData>
```

Also present is an operation action that references this dataset resource:

```
<mcd-ad:ActionDisplayText>OP_ACT1</mcd-ad:ActionDisplayText>
<mcd-common:Description>op action 1</mcd-common:Description>
<mcd-common:ToolTip>action 1</mcd-common:ToolTip>
<mcd-ad:ActionServiceRequest>
    <mcd-srd:GenericExecuteService>
        <mcd-srd:ProgramName>ACT1</mcd-srd:ProgramName>
        <mcd-srd:InputDataset datasetAllocationType="static"
        datasetUsageType="INPUT" ddname="SYSIN">
            <mcd-srd:Entry>
                <mcd-srd:DatasetIDRef>AAAAAAA.DS047557</mcd-srd:DatasetIDRef>
            </mcd-srd:Entry>
        </mcd-srd:InputDataset>
    </mcd-srd:GenericExecuteService>
</mcd-ad:ActionServiceRequest>
```

The new FMID is called BBBBBBB (this was entered in the UI). Compare the new XML to the old, notice that only the ID references are different:

```
Resource...
    <mcd-crd:ResourceName>RESOURCE_A</mcd-crd:ResourceName>
    <mcd-common:Description>RESOURCE_A</mcd-common:Description>
    <mcd-common:ToolTip>RESOURCE_A</mcd-common:ToolTip>
    <mcd-crd:Dataset id="BBBBBBB.DS047579">
        <mcd-crd:DatasetDefinition>
```

-continued

```
        <mcd-dd:MvsDataset dummy="false" temporary="false"
            dsname="DS_A"/>
        </mcd-crd:DatasetDefinition>
    </mcd-crd:Dataset>
    <mcd-crd:ResourceTrackingData hasBeenConfirmed="false"
maintenanceSensitiveResource="false" hasBeenM
        <mcd-crd:ResourceTrackingID>RES_A_TRACKING_ID</mcd-
            crd:ResourceTrackingID>
        <mcd-crd:ResourceScope scope="INSTANCE"/>
        <mcd-crd:ResourceLevel>0</mcd-crd:ResourceLevel>
        <mcd-crd:ResourceTargetLevel>0</mcd-crd:ResourceTargetLevel>
    </mcd-crd:ResourceTrackingData>
Operation Action...
    <mcd-ad:ActionDisplayText>OP_ACT1</mcd-ad:ActionDisplayText>
    <mcd-common:Description>op action 1</mcd-common:Description>
    <mcd-common:ToolTip>action 1</mcd-common:ToolTip>
    <mcd-ad: ActionServiceRequest>
        <mcd-srd:GenericExecuteService>
            <mcd-srd:ProgramName>ACT1</mcd-srd:ProgramName>
            <mcd-srd:InputDataset datasetAllocationType="static"
            datasetUsageType="INPUT" ddname="SYSIN">
                <mcd-srd:Entry>
                    <mcd-srd:DatasetIDRef:.BBBBBBBB.DS047579</mcd-
                    srd:DatasetIDRef>
                </mcd-srd:Entry>
            </mcd-srd:InputDataset>
        </mcd-srd:GenericExecuteService>
    </mcd-ad: ActionServiceRequest>
```

Operations of FIG. 22 can effect this change as follows:

```
@Entity(name = "OperationDescriptorType")
@DiscriminatorColumn (name = "DTYPE", length = 255)
@DiscriminatorValue ("OPERATIONDESCRIPTORTYPE")
@Table (name = "OPERATIONDESCRIPTORTYPE")
@"Inheritance (strategy = InheritanceType.JOINED)
@EntityDescriptor (name = "Operation", description = "Entity of type:
OperationDescriptorType")
public class OperationDescriptorType
    extends AbstractMDBEntity
    implements Serializable, Equals, Hashcode {
```

An operation can have many operation actions. If an operation is deleted, then the actions should also be deleted. The cascade annotation instructs the compile/application to do this.

This is the container class reference in the operation:

```
    @OneToOne(targetEntity = OperationActionSetType.class, cascade = {
            CascadeType.ALL
    }, orphanRemoval = true, optional = true)
    @JoinColumn (name = OPERATIONACTIONSET_OPERATION_0")
    public OperationActionSetType getOperationActionSet ( ) { return operationActionSet; }
and this is the declaration of the actions:
    @OneToMany (cascade = {CascadeType.ALL}, orphanRemoval = true)
    @JoinTable (
            name = OPERATIONACTIONSET_ACTIONS",
            joinColumns = {@JoinColumn (name = "ACTIONSET_HJID")},
            inverseJoinColumns = {@JoinColumn (name = ACTION_HJID")}
    )
    @OrderColumn
    @CascadeOnDelete
    public List<ActionDescriptorType> getAction( ) {
        if      (action == null) {
                action = new ArrayList<ActionDescriptorType>( );
        }
        return this.action;
    }
```

"Return types" refer to the object refer to the object and its type that is returned by invoking/executing a call on the class method. For example, invoking method "getOperationActionSet( )" will return an Data Object of type OperationActionSetType.

The return type of "getAction( )" is a collection of type ActionDescriptorType or List<ActionDescriptorType>. Reflection retrieves and compares the cascade values from the annotations (code beginning with the @) from where it was received. FIG. 22 depicts the path that the routine will follow when it scans the branch of the configuration pertaining to the operation which references the dataset resource RESOURCE_A. Each node is a Java object and is checked does it meet the criteria for recursive traversal (Block 2010), collection processing (Block 2204), replace the old ID ref with the new ID ref (Block 2214) or ignored (Block 2222). The "others" boxes refer to the other properties in the class, but this example only chooses the path to the dataset for this example.

OperationDescriptorType is annotated with @Entity so it should be processed (Block 2201). Now scan each public "getter" method in the class and process accordingly (Block 2206). getDisplayTextType returns an @Entity type of DisplayTextType (Block 2201) and is not a collection (Block 2202) to execute the getDisplayTextType in the OperationDescriptorType (parent) object. DisplayTextType is not a collection (Block 2202) and is not an ID reference object (Block 2219), so set it as a parent object (Block 2210) and recursively process it (Block 2010).

Entering the Block 2010 flowchart with DisplayTextType as the parent, scan its properties. Examining its contents, the operations encounter a getId method which is ignored as it is annotated with @Id (Block 2206). Another method "getValue" returns a string object which is not an @Entity so it's ignored (Block 2206). Processing continues until all methods are read, none of which meet any criteria for further processing (Block 2205). The recursive method returns to the point where DisplayTextType was set as the parent (Block 2200). The next method in OperationDescriptorType is read (Block 2203).

Processing continues like this until operations find the "getOperationActionSetType" method (Block 2207). OperationActionSetType is an @Entity and is not a collection and is not an ID reference type object so it is set as the parent and recursively processed (Block 2010). The "getId" method is ignored as it is annotated with @Id (Block 2206). "getActionDescriptorType" returns a collection (Block 2215), so process each element in the list (Block 2202). ActionDescriptorType is an @Entity (Block 2208). The first element is an @Entity of DisplayTextType (Block 2208). This not a collection or an ID reference object, so set it as the parent (Block 2200) and process recursively (see above). Next method is "getServiceDescriptorType" this is an @Entity (Block 2201) and not a collection (Block 2202), so set as parent and process.

Process the methods in ServiceDescriptorType as above. When "getGenericExecuteService" is encountered, this is an @Entity (Block 2201) and not a collection (Block 2202), so set as parent and process.

Process the methods in GenericExecuteService as above. When "getInstreamConcatenationTypes" is encountered, this is not an @Entity (Block 2201) but is a collection (Block 2202), so process each element.

The "getEntry" method in InstreamConcatenationType is an @Entity (Block 2201), so set it as the parent (Block 2200) and recursively process.

The "getInstreamConcatenationEntryType" returns a collection (Block 2202), so process each element (Block 2204).

One of the public methods in InstreamConcatenationEntryType is "getDatasetType". This is an @Entity but does NOT have Cascade.ALL or Cascade.DELETE (Block 2211).

The return type is an @Entity and it is also an ID Reference object (it inherits an interface which make it an ID ref) (Block 2219). Therefore, this object is a candidate for ID reference processing (Block 2220). The final check is to execute the method "populateIdRefData" (Block 2214) using the 1-1 mapping of old to new IDs. This method will populate any internal variables and/or data which the application will use to construct the new object and retain its relationships with other objects.

Operations have now finished (Block 2217), so start working back up the stack (Block 2010) to the next method in the parent (Block 2205). Continue with this routine until all the methods in all objects have been considered.

Embodiments of the present disclosure were described herein with reference to the accompanying drawings. Other embodiments may take many different forms and should not be construed as limited to the embodiments set forth herein. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein. As used herein, the term "and/or" includes any and all combinations of one or more of the associated listed items.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or otherwise structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the disclosure being set forth in the following claims.

What is claimed is:

1. A method of operating a computer system comprising:
    converting first metadata for a first version of a computer program and a first metadata schema into second metadata for a second version of the computer program and/or for a second metadata schema, wherein the converting comprises:
    importing a first extensible markup language (XML) file comprising the first metadata into a first XML object;
    obtaining working variables for the second metadata and/or the second version of the computer program;
    converting a first set of identification (ID) references in the first XML object to a second set of ID references;
    unmarshalling the first XML object that includes the second set of ID references to generate a first object class structure that conforms to the second metadata schema and/or the second version of the computer program, using the working variables;
    recursively processing the first object class structure to construct objects and their contents pursuant to the second set of ID references and thereby generate a second object class structure; and
    marshalling the second object class structure to generate a second XML object.

2. The method according to claim 1 wherein the recursively processing comprises:
    traversing the first object class structure to identify an object therein that contains a member of the second set of ID references;
    calling methods of the object that was identified by the traversing, to populate the content of the object that was identified by the traversing, using the member of the second set of ID references; and
    repeating the traversing and the calling until the objects in the first object class structure have been processed.

3. The method according to claim 2 wherein the calling comprises:

using object reflection to call the methods of the object that was identified by the traversing, using the member of the second set of ID references.

4. The method according to claim 1 wherein the converting comprises:
recursively processing an object class structure representing the second metadata to construct objects and their contents pursuant to a set of ID references for the second metadata.

5. The method according to claim 4 wherein the recursively processing comprises:
repeatedly calling methods of an object in the object class structure to populate the content of the object using the set of ID references.

6. The method according to claim 5 wherein the repeatedly calling is performed using object reflection.

7. The method of claim 1, wherein converting the first set of ID references comprises:
determining, for a first ID reference in the first set of ID references, a class type corresponding to an object associated with the first ID reference; and
generating, based at least in part on the class type, a second ID reference in the second set of ID references.

8. A non-transitory tangible computer readable storage medium comprising computer readable program code embodied in the medium that when executed by at least one processor of a computer system causes the computer system to convert first metadata for a first version of a computer program and a first metadata schema into second metadata for a second version of the computer program and/or for a second metadata schema, wherein the program code causes:
importing a first extensible markup language (XML) file comprising the first metadata into a first XML object;
obtaining working variables for the second metadata and/or the second version of the computer program;
converting a first set of identification (ID) references in the first XML object to a second set of ID references;
unmarshalling the first XML object that includes the second set of ID references to generate a first object class structure that conforms to the second metadata schema and/or the second version of the computer program, using the working variables;
recursively processing the first object class structure to construct objects and their contents pursuant to the second set of ID references and thereby generate a second object class structure; and
marshalling the second object class structure to generate a second XML object.

9. The non-transitory tangible computer readable storage medium according to claim 8 wherein the computer readable program code causing the recursively processing the first object class structure comprises further computer readable program code that causes:
traversing the first object class structure to identify an object therein that contains a member of the second set of ID references;
calling methods of the object that was identified by the traversing, to populate the content of the object that was identified by the traversing, using the member of the second set of ID references; and
repeating the traversing and the calling until the objects in the first object class structure have been processed.

10. The non-transitory tangible computer readable storage medium according to claim 9 wherein the computer readable program code causing the calling the methods of the object comprises additional computer readable program code that causes:
using object reflection to call the methods of the object that was identified by the traversing, using the member of the second set of ID references.

11. The non-transitory tangible computer readable storage medium according to claim 8 wherein the computer readable program code comprises further computer readable program code that causes:
recursively processing an object class structure representing the second metadata to construct objects and their contents pursuant to a set of ID references for the second metadata.

12. The non-transitory tangible computer readable storage medium according to claim 11 wherein the program code causing the recursively processing the object class structure representing the second metadata comprises additional computer readable program code that causes:
repeatedly calling methods of an object in the object class structure to populate the content of the object using the set of ID references.

13. The non-transitory tangible computer readable storage medium according to claim 12 wherein the repeatedly calling is performed using object reflection.

14. The computer readable storage medium according to claim 8 wherein the program code causing the converting the first set of in references comprises computer readable program code that causes:
determining, for a first ID reference in the first set of ID references, a class type corresponding to an object associated with the first ID reference; and
generating, based at least in part on the class type, a second ID reference in the second set of ID references.

15. A computer system comprising:
a processor; and
memory storing instructions comprising a metadata importing system that runs on the processor and is configured to
convert first metadata for a first version of a computer program and a first metadata schema into second metadata for a second version of the computer program and/or for a second metadata schema, wherein the instructions comprise computer readable program code that causes the processor to:
import a first extensible markup language (XML) file comprising the first metadata into a first XML object;
obtain working variables for the second metadata and/or the second version of the computer program;
convert a first set of identification (ID) references in the first XML object to a second set of ID references;
unmarshal the first XML object that includes the second set of ID references to generate a first object class structure that conforms to the second metadata schema and/or the second version of the computer program, using the working variables;
recursively process the first object class structure to construct objects and their contents pursuant to the second set of ID references and thereby generate a second object class structure; and
marshal the second object class structure to generate a second XML object.

16. The computer system according to claim 15 wherein the computer readable program code that causes the processor to recursively process the first object class structure to construct objects and their contents comprises further computer readable program code that causes the program to:
traverse the first object class structure to identify an object therein that contains a member of the second set of ID references;

call methods of the object that was identified by traversing, to populate the content of the object that was identified by traversing, using the member of the second set of ID references; and repeat traversing and calling until the objects in the first object class structure have been processed.

17. The computer system according to claim 16 wherein the computer readable program code that causes the processor to call comprises additional computer readable program code that causes the processor to:

use object reflection to call the methods of the object that was identified by the traversing, using the member of the second set of ID references.

18. The computer system according to claim 15 wherein the instructions further comprise additional computer readable program code that causes the processor to:

recursively process an object class structure representing the second metadata to construct objects and their contents pursuant to a set of ID references for the second metadata.

19. The computer system according to claim 15, wherein computer readable program code that causes the processor to convert the first set of ID references comprises computer readable program code that causes the processor to:

determine, for a first ID reference in the first set of ID references, a class type corresponding to an object associated with the first ID reference; and generate, based at least in part on the class type, a second ID reference in the second set of ID references.

\* \* \* \* \*